(12) United States Patent
Roberts

(10) Patent No.: US 7,069,188 B2
(45) Date of Patent: Jun. 27, 2006

(54) INFORMATION MANAGEMENT SYSTEM

(75) Inventor: Josh R. Roberts, Washington, DC (US)

(73) Assignee: Eye on Solutions, LLC, Pittsburgh, PA (US)

( * ) Notice: Subject to any disclaimer, the term of this patent is extended or adjusted under 35 U.S.C. 154(b) by 0 days.

(21) Appl. No.: 10/844,283

(22) Filed: May 12, 2004

(65) Prior Publication Data

US 2005/0143959 A1    Jun. 30, 2005

Related U.S. Application Data

(63) Continuation of application No. 09/932,244, filed on Aug. 17, 2001, now Pat. No. 6,792,395, which is a continuation-in-part of application No. 09/642,589, filed on Aug. 22, 2000, now abandoned.

(51) Int. Cl.
*G06F 15/00* (2006.01)

(52) U.S. Cl. .......................................... 702/188; 379/39

(58) Field of Classification Search ................ 702/158, 702/130, 138, 142, 173–175; 340/870.16, 340/573, 652; 455/3.03–3.04, 40.66; 379/38–39, 379/42–44, 50
See application file for complete search history.

(56) References Cited

U.S. PATENT DOCUMENTS

| 4,937,555 | A | 6/1990 | Litzkow et al. |
|---|---|---|---|
| 4,941,356 | A | 7/1990 | Pallaske |
| 5,005,416 | A | 4/1991 | Vick et al. |
| 5,566,069 | A | 10/1996 | Clark et al. |
| 5,575,105 | A | 11/1996 | Otomo |
| 5,748,852 | A | 5/1998 | Mahler |
| 6,046,462 | A | 4/2000 | Yokajty et al. |
| 6,052,066 | A | 4/2000 | Su |
| 6,192,320 | B1 | 2/2001 | Margrey et al. |
| 6,294,999 | B1 | 9/2001 | Yarin et al. |
| 6,327,533 | B1 | 12/2001 | Chou |
| 6,405,135 | B1 | 6/2002 | Adriany et al. |
| 6,415,291 | B1 | 7/2002 | Bouve et al. |
| 6,437,692 | B1 | 8/2002 | Petite et al. |
| 6,445,298 | B1 | 9/2002 | Shepher |
| 6,445,301 | B1 | 9/2002 | Farrell et al. |

FOREIGN PATENT DOCUMENTS

EP         0 924 949 A1    10/1998

OTHER PUBLICATIONS

XP-001023700, Wireless Integrated Network Sensors (WINS), Asada G., et al.

*Primary Examiner*—Marc S. Hoff
*Assistant Examiner*—Mary Catherine Baran
(74) *Attorney, Agent, or Firm*—Christine W. Trebilcock, Esq.; Alicia M. Passerin, Esq.; Cohen & Grigsby, P.C.

(57) ABSTRACT

A system sends an electrical signal communicated over a communication link. Both a system hardware and communication architecture and a software data processing system are provided to permit gathering, transmission, processing, storage, access, presentation and use of the data gathered by the system of the present invention.

10 Claims, 60 Drawing Sheets

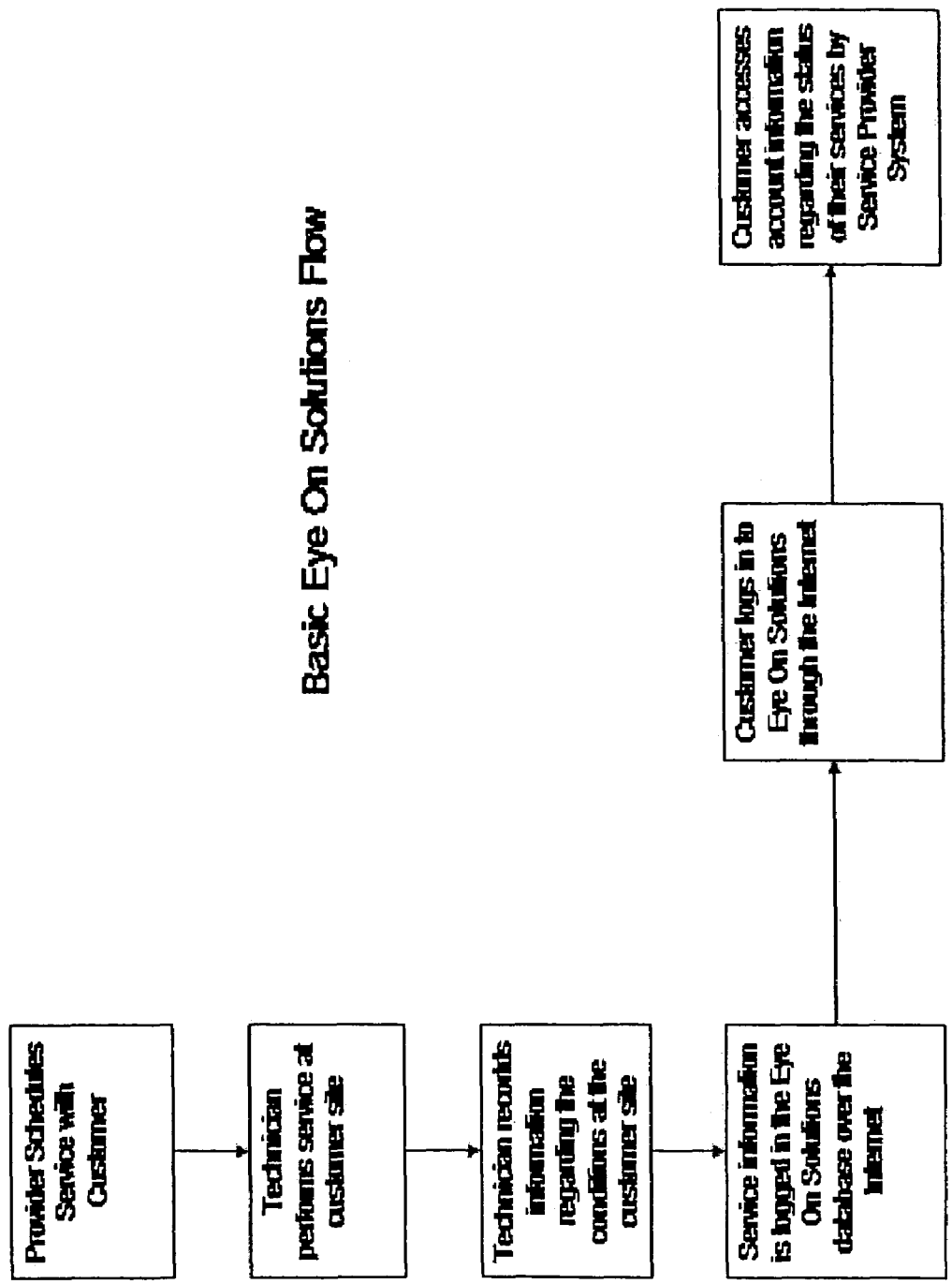

Witt Pest Management  
3/23/2001 10:34:31 AM

Termite Continuous Protection Plan  
DETAIL REPORT

318 Longwood Drive  Pittsburgh, PA 15221

Station In Ground No. 6

| Service Type: Continuous Protection | | Service Date: 01/21/2001 | Service Period: February 2001 | |
|---|---|---|---|---|
| Unit | Value | Status | Condition of Termites | Conditions Found |
| In Ground 6 | 1 | Install Date | N/A | N/A |

Station In Ground No. 6

| Service Type: Continuous Protection | | Service Date: 02/16/2001 | Service Period: March 2001 | |
|---|---|---|---|---|
| Unit | Value | Status | Condition of Termites | Conditions Found |
| In Ground 6 | 3 | First Hit | Active | Leaking downspouts. |
| In Ground 6 | 3 | Baited | N/A | N/A |

Station In Ground No. 6

| Service Type: Continuous Protection | | Service Date: 03/21/2001 | Service Period: March 2001 | |
|---|---|---|---|---|
| Unit | Value | Status | Condition of Termites | Conditions Found |
| In Ground 6 | 2 | Bait tube replaced | Termites changing color to milky white. | Leaking downspouts. |

INFORMATION MANAGEMENT SYSTEM

CROSS REFERENCE

This application is a continuation of U.S. application Ser. No. 09/932,244 filed Aug. 17, 2001, now U.S. Pat. No. 6,792,395 which was a continuation-in-part (CIP) of U.S. patent application Ser. No. 09/642,589 filed Aug. 22, 2000.

FIELD OF THE INVENTION

This invention relates to the use of remote detection methods to provide a repository of information which is remotely accessible for computerized management, monitoring and control of a condition; and in particular to the use of remote detection systems to provide a database that is accessible over a computer network such as the internet for use in pest monitoring, management and control.

BACKGROUND OF THE INVENTION

The present invention addresses problems existing in the pest control industry with respect to pest detection, monitoring, management and control. Integrated pest management ("IPM") involves the coordinated use of pest and environmental information with available pest control methods to prevent unacceptable levels of pest damage by the most economical means and with the least possible hazard to people, property and the environment.

Conventional pest management typically consists of two separate steps: detection and preventative and corrective treatment. Detection involves the physical inspection of a facility for pests. If activity is spotted, the area is treated with pesticides to control the insect population. This type of monitoring system requires regular examination of the premises by a technician in order to determine the amount of pest activity. The greatest expense a pest control facility faces is the labor involved with the constant inspection of all customer locations. Approximately 75 percent of a technician's time is spent performing on site inspections. Pest management services historically have been curative treatments that require little extended service. More recently they have become and in some cases are becoming longer term monitoring and preventative services. The difficulty in the industry has been proving these services as a value to the customer for the long term. The industry can be divided into three different types of services, some companies provide all three services, while others only one or two of them. These include commercial integrated pest management ("IPM"), termite monitoring, and residential treatments. Each adheres to the more recent trend towards long term monitoring and preventative services.

Commercial IPM is the regular monitoring, inspection, and treatment of commercial facilities for existing and potential pest problems that could be damaging to the business of the customer. This includes both multi-location and single location businesses, including food management businesses, schools, hospitals, child and elderly care facilities, warehouses, etc. Not only are pest problems damaging to these operations, but the extensive use of chemicals to treat these problems can be damaging as well. In order to keep the level f chemical usage to a minimum, commercial IPM practices include regular inspections to identify problems before they become damaging and using mechanical trapping devices, natural predators (e.g., insects that eat other insects), insect growth regulators, mating disruption substances (pheromones), and if necessary, chemical pesticides. The problem with Commercial IPM services is that it can be expensive for a pest control operator to provide since it inherently requires a high level of cooperation and interaction with the customer. This is a level of service that requires resources that many pest control operators cannot afford to maintain.

Termite baiting systems have become a regular practice in the pest management industry for the elimination of termites. Systems such as Dow AgroSciences' Sentricon Colony Elimination System™ are being widely used by pest control operators to eliminate termite colonies and monitor for new colonies. Termites feed on wood, which is the material that many homes are constructed with. One home can have several colonies of termites living near it, and each colony has foragers that seek food for the colony. The foragers dig through the soil until they find a food source, whereupon the rest of the colony is alerted as to the location of the food source. The tendency of homeowners to cancel service once a termite colony is eliminated creates the potential for future damaging termite problems, because the elimination of one colony near a home does not prevent other still-existing colonies from foraging for food near (and thereby finding their way into) the home at the same time.

Residential treatments include all services provided to homeowners other than termite treatments. These services can be broken down into two different types of offerings, Quarterlies and Warranties. Quarterlies are contracts that a pest control operator has with a residential customer to provide primarily exterior perimeter treatments of the home on a quarterly basis. These treatments focus on forming a barrier around the outside of the home to prevent pests from entering the structure as well as monitoring for trouble spots that may need special attention by the homeowner. Warranties are similar to insurance policies in that the pest control operators sell a guarantee for treatments covering a certain period of time. If the treatments are unsuccessful and pest damage occurs the pest control operator pays for any damage caused up to a certain dollar amount and retreats the structure. Warranties are usually treated once, when the warranty is sold. Similar to termite baiting systems, the problem with residential treatments is that it is difficult to prove the long term value of the process to the customer since they rarely see their home being serviced. At most the homeowner will receive a notification that the pest control technician was there.

In general, conventional pest detection systems only detect the presence or absence of a particular environmental factor, for example, whether a circuit is broken or not, or whether vibrations are present or not, etc. As a result, the conventional pest detection data can only serve a limited purpose in connection with pest management process. Conventional methods that monitor and control pests are disclosed in U.S. Pat. Nos. 4,937,555 and 4,941,356. These methods use probes that detect insect vibrations within a particular media, such as stored grain or wood substrate. Under these methods, a detection device is manually inserted into a test media, requiring the presence of a technician who monitors insect vibrations. In addition, U.S. Pat. No. 5,566,069 discloses embedding wires in an edible bait block that upon structural destruction cause a detecting terminal to come into contact with a magnetic circuit, whereby an alarm is activated. Moreover, U.S. Pat. No. 5,575,105 discloses block holes with an emitting element at one end and a receiving element at the other. A warning is triggered when an insect traveling through the hole breaks the wave produced by the elements. Other conventional methods remotely monitor and collect data via sensors that transmit pest related data to a data collection unit. For example, U.S. Pat. Nos. 5,005,416 and 5,285,688 disclose an apparatus that may be lowered into stored grain or corn for sensing insect vibrations. Related data is transmitted to a host computer for processing and issuing alerts. Similarly, U.S. Pat. No. 6,052,066 discloses a thin strip of conductive wire that is threaded through a sensor made of edible material. The sensor includes a break circuit that periodically or on demand communicates, via wired or wireless links, detection data to a data collection unit.

As a result of the above-described examples of shortcomings in pest detection, monitoring and management, there exists a need to gather, process and present pest related data in a more valuable way so that it can be used in a wider variety of pest management applications, and in other applications requiring the remote detection, monitoring and management of a condition, and the remote gathering, processing, storage, access, presentation and use of data relating to the monitored condition.

SUMMARY OF THE INVENTION

The present invention provides a system hardware and communication architecture along with a software data processing system to permit the novel gathering, transmission, processing, storage, access, presentation and use of data generated by remote detection, monitoring and management systems. Although the present invention is described with respect to presently preferred embodiments relating to pest detection, monitoring and management applications, it is understood that the features of the invention can be applied to any application requiring the remote detection, monitoring and management of a condition, and the remote gathering, processing, storage, access, presentation and use of data related to the monitored condition.

The invention preferably implements a sensing device for detecting the monitored condition, which can be any one or a combination of transducers, such as an optical sensor, a piezoelectric sensor, a pressure sensor, a microphone, a load cell or a camera, among other suitable transducers. The communication link over which the monitored data is communicated can be either a wired or wireless link. Examples of the wired link protocols that may be used in connection with the present invention include the TCP/IP, X-10, CeBus, and Lonworks protocols. The wireless link that can be used in an exemplary embodiment of the invention may be configured to comply with any suitable wireless application or wireless air interface protocols. Moreover, a receiver can be used for receiving a request for information from the user over the communication link. In this way, the invention can establish two-way communication for transfer of data. For example, client stations connected to the Internet can be used to receive information originating from detectors located at various remotely monitored zones. Based on a user request, the transmitter can transmit the monitored data or other sensor unit related data on demand. Alternatively, the sensor unit can be programmed to transmit such data periodically, in predefined intervals or continuously.

In accordance with another aspect of the invention, a detection system uses one or more sensor units to generate the data representative of the monitored condition. A data collector receives the data monitored by the detector for transmission over the communication link to a server which processes the data for storage in a database and provides access to the database for retrieving and processing the stored data for use. In this way, the system of the invention can allow the user to make various determinations in connection with the detected condition. Data associated with the determinations can be transmitted via the Internet for further remote processing or viewing.

In addition, the present invention provides an application service provider ("ASP") database solution for service providers and their customers, accessible over a communication network such as the Internet, to allow the gathering, processing, storage, receipt and use of information related to the services provided to the customer, including use of detection data generated from remotely monitored conditions. The types of data and functionality provided by the ASP may be customized directly by the customer or service provider, and can change depending on the particular application (or type of service) for which the system is used by that customer and/or service provider, which can result in multiple configurations existing for the same customer and/or service provider when the system is used for multiple applications. The ASP, either itself or through the service providers, hosts and maintains the core application hardware, software and databases (including security). Through a network communication link established over the Internet, customers and service providers can remotely input and access data, designate system users and access rights, and identify preferences to determine the functionality provided by the ASP. The system can be used on a multiple customer/multiple service provider basis, wherein more than one customer of each service provider can access the ASP to receive information from that service provider, or wherein each customer can access information from multiple service providers each having an account with that customer.

The preferred embodiment of the present invention relates to the remote sensing of at least one physical characteristic of one or more pests or baits or environmental conditions. For example, the physical characteristic can correspond to any one or a combination of weight, length, width, height, volume, scent, density, moisture, or acoustic characteristics of the pest or bait or environmental condition. A suitable sensing device generates an electrical signal that corresponds to a detected physical characteristic, with the generated electrical signal being applied to a processor. The processor processes the electrical signal to provide physical characteristic data. A transmitter transmits the physical characteristic data in accordance with a predefined messaging format over a communication link, such as the Internet. The physical characteristic data for pests, bait or environmental conditions can be used in a variety of pest management applications. For example, based on the physical characteristic data related to length, width, or height, the sensing system of the invention can determine the type of a detected pest. Similarly, based on physical characteristic data related to the volume, weight, or density of the bait, the system can assess the effectiveness of the bait as applied to a treated zone or region. Also, based on physical characteristic data related to the moisture level at or near the sensor, the system can determine the type of treatment that may be necessary to prevent potential pest problems. The sensor unit can also transmit data related to any one of battery life, bait weight changes, sound identification, pest activity levels, bait age, bait status, etc. An identification module can provide sensor unit identification data that can also be communicated along with associated physical characteristic data.

These and other advantages of the invention will become apparent from a perusal of the following detailed description of the presently preferred embodiments of the invention taken in connection with the accompanying drawings.

FIG. (6B) shows the hierarchical breakdown of administrative system functions provided by the present invention.

FIG. (6C) shows the basic process of the present invention.

FIGS. (7A) through (7C) demonstrate the procedure used to customize the system for a designated customer of a particular service provider.

FIGS. (8A) through (8J) demonstrate the procedure by which the service provider user inputs and a customer user accesses data recorded for an instance of service activity completed for a particular customer.

FIGS. (9A) through (9L) demonstrate the types of functionality available for a pest monitoring service through use of the present invention, described with reference to a typical termite baiting process.

FIGS. (10A) through (10Z) demonstrate the customer administration features of the system

DETAILED DESCRIPTION OF THE PRESENTLY PREFERRED EMBODIMENTS

Both a system hardware and communication architecture and a software data processing system are provided to permit gathering, transmission, processing, storage, access, presentation and use of the data gathered by the detection, monitoring and management system of the present invention.

System Architecture

Figure 1:
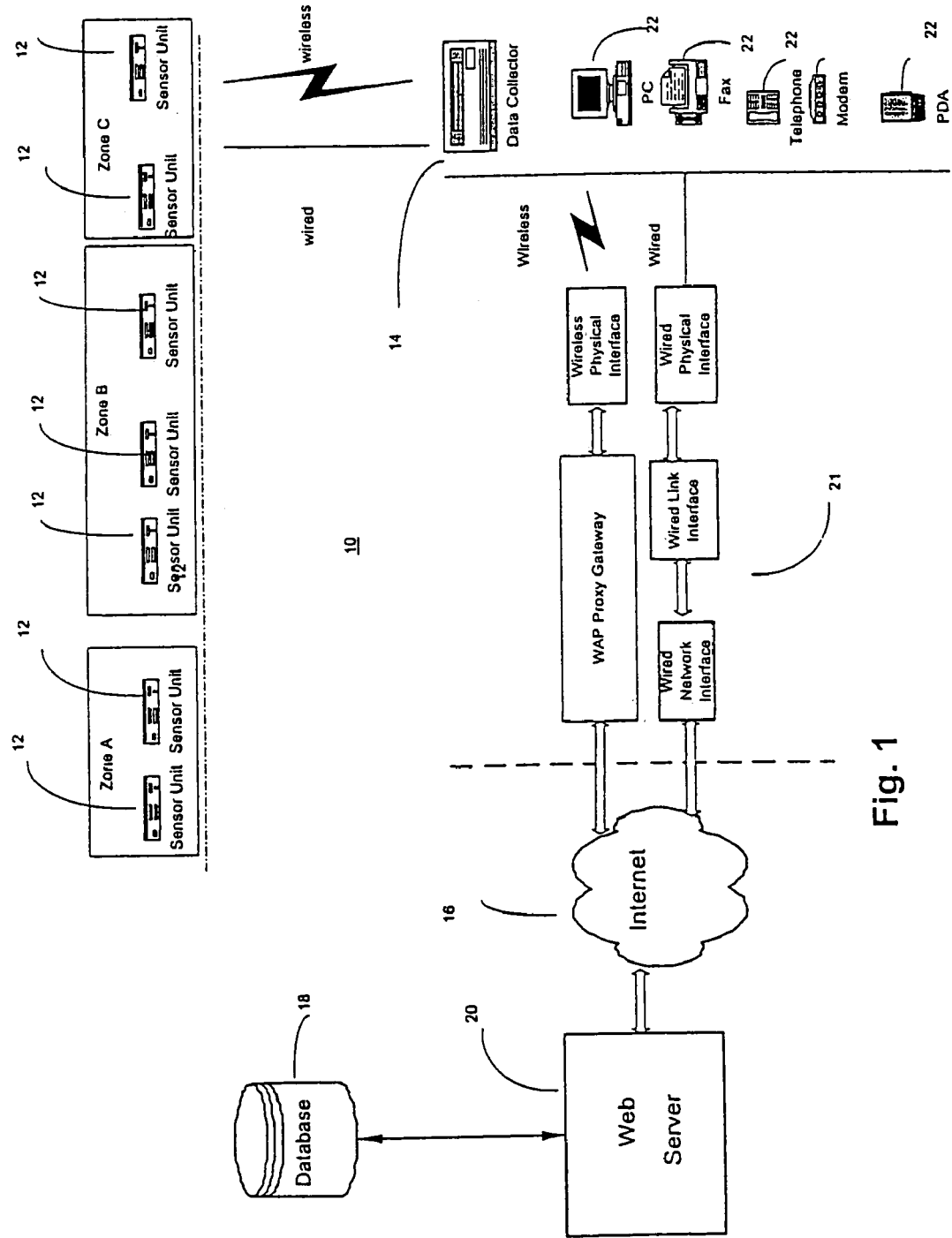
FIG. 1 illustrates a system that implements the present invention.

Referring to FIG. 1, a system 10 that advantageously implements the present invention is shown. The system 10 is preferably implemented over a communication network that provides wired or wireless links with sensor units 12, which operate in accordance with the present invention. The sensor units 12 can be placed in designated control and detection zones A, B, or C. From a zone, each sensor unit communicates with a data collector unit 14 that collect information gathered from a number of the sensor units 12. The sensor units 12 can communicate with the data collector 14 through wired or wireless communication links. The wired communication link can, for example, be used for home appliance networking. Examples of such links include those defined by X-10, CeBus, and Lonworks standards. Various wireless links that support defined protocols can also be used for wireless communication of pest related data. The wireless physical channel for implementing the present invention can be either analog or digital radio frequency (RF) channels, for example, those that are based on Time Division Multiple Access (or "multiplexing") (TDMA) protocols. The system 10 can use a common unlicensed radio frequency band slightly under 1 Ghz. The communication protocol can be a proprietary or nonproprietary link protocol. Examples of the wireless protocols include those defined by GSM, IS-136, IS-95, Bluetooth, MEN, etc., and other IEEE standards.

In the preferred embodiment, the present invention also uses the Internet 16, which is a collection of interconnected (public and/or private) networks that are linked together by a set of standard protocols (such as WAP, or TCP/IP) to form a global distributed network. The system of the present invention can use any one of open- or proprietary-network standards. As is known, Internet is a distributed network that supports the World Wide Web ("Web"). The Web refers generally to both (i) a distributed collection of inter-linked, user-viewable hypertext documents (commonly referred to as Web documents or Web pages) that are accessible via the Internet, and (ii) the user and server software components which provide user access to such documents using standardized Internet protocols.

Currently, the primary standard protocol for allowing applications to locate and acquire Web documents is HTTP, and the Web pages are encoded using HTML. WML is the markup language used by WAP. The terms "Web" and "World Wide Web" encompass future markup languages and transport protocols which may be used in place of (or in addition to) HTML, WML, XML, WAP and HTTP. The present invention can also operate on internal networks (Intranets) and networks utilizing different communication protocols. A Web Site or server is a computer system that processes and serves informational content over the network using the standard protocols of the World Wide Web. Typically, a Web site corresponds to a particular Internet domain name and includes the content associated with a particular organization. As used herein, the term is generally intended to encompass both (i) the hardware/software server components that serve the informational content to users over the network, and (ii) the "back end" hardware/software components, including any non-standard or specialized components, that interact with the server components to perform services for Web site users.

As shown in FIG. 1, the system 10 includes a database 18, preferably implemented by conventional software such as Microsoft Access® or Sequel Server® that is accessible by a Web server 20, which is preferably implemented by an application programming interface (API) such as the Microsoft Windows® API. The Web server 20 communicates with wired or wireless user devices 22, for example, telephones, personal computers, facsimile machines, modems and personal digital assistants and their equivalents. In this way, data produced at the sensor units 12 can be collected at the data collector unit 14, which routes the data to the Web server 20 through the Internet 16 and network layer interfaces 21. The Web server 20 can periodically retrieve the sensor data gathered at the data collector unit 14 for storage in the database 18 after its transmission from the data collection unit 14 over the Internet 16 via network layer interfaces 21. The user devices 22 can then access the processed data for use in a desired pest management application by sending requests over the Internet 16 via network layer interfaces 21 to the Web server 20 which then retrieves the requested data from the database 18 and transmits it back over the Internet 16 via network layer interfaces 21 to the user devices 22. Alternately, the user devices can receive unsolicited transmissions of the processed data from the Web server 20 in the same manner for use in a desired pest management application.

Figure 2:
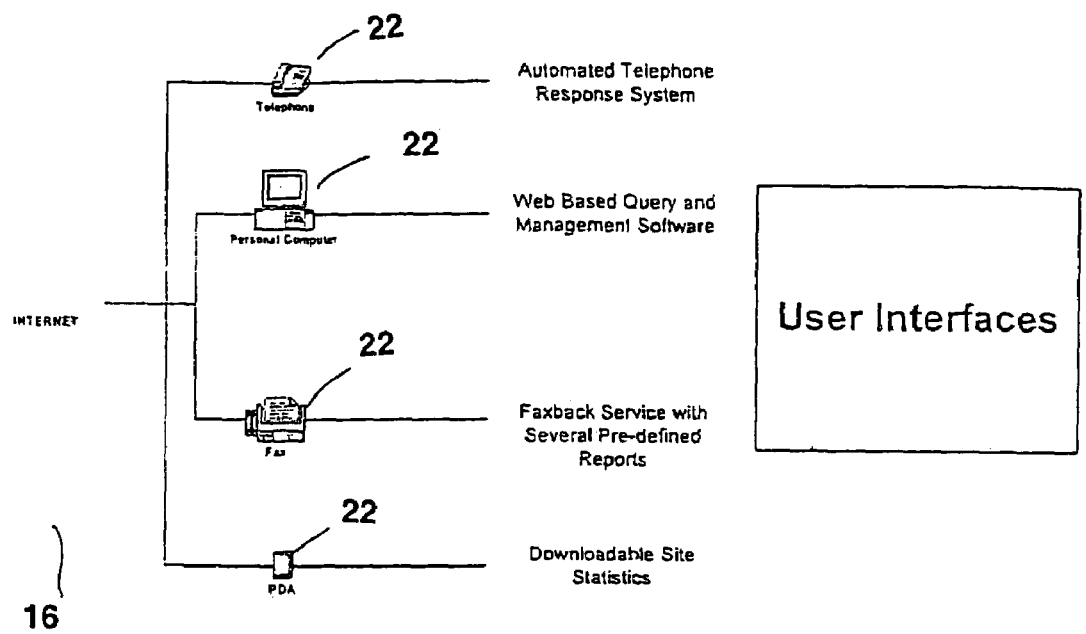
FIG. 2 illustrates the type of information that can be communicated with different user devices.

As shown in FIG. 2, the information with the user device 22 can be communicated in connection with an automated telephone response system. A personal computer that runs suitable management software can be used for Web-based query and other types of information access and retrieval over a modem link. A fax back service can be used to provide user defined reports of pest detection and control activity. A PDA may also be used to download site statistics.

The present invention utilizes the standard Internet protocols for the various user devices 22 and the data collector unit 14 that connect to the Web server 20. For wired devices, these standards include the well-known Ethernet and TCP/IP protocols. For wireless devices, the preferred embodiment of the invention uses a Wireless Application Protocol or other future standards. The WAP environment generally consists of a WAP client device, WAP Proxy/gateway, and WAP server. Any one of the user devices 22, the sensor unit 12, or the data collector unit 14, can operate as a WAP or TCP/IP Client.

Figure 3:
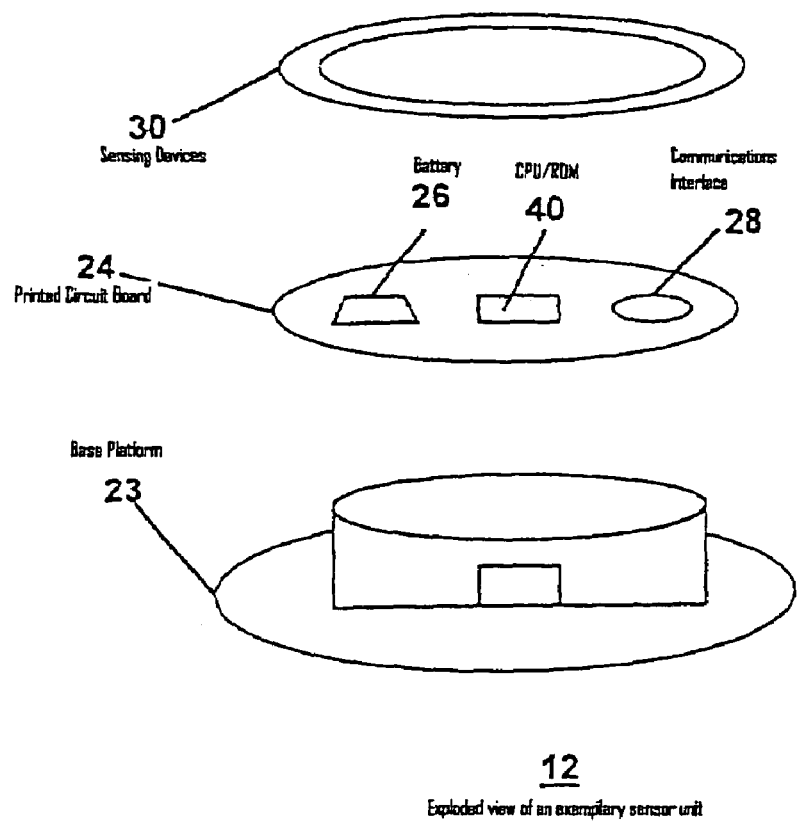
FIG. 3 illustrates an exploded view of an exemplary sensor unit in accordance with the present invention.
Figure 4:
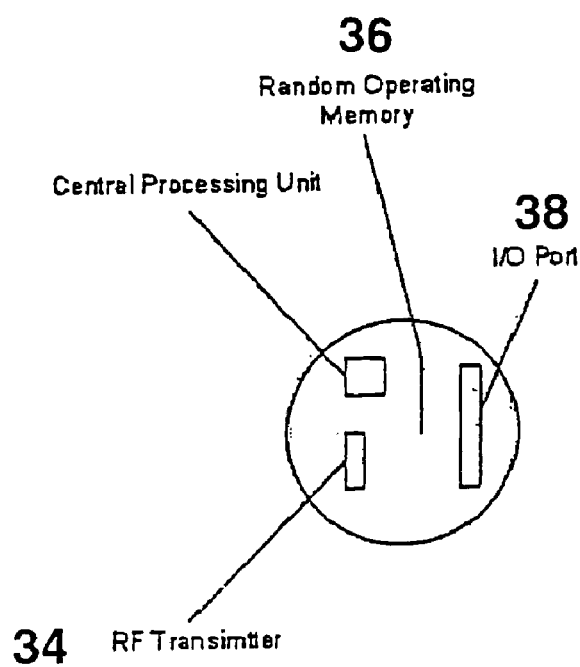
FIG. 4 illustrates a circuit board used in the sensor unit of FIG. 3.

Referring to FIG. 3, an exploded view of an exemplary sensor unit 12 in accordance with the present invention is shown. The sensor unit 12 has a base platform 23 that secures a printed circuit board 24, battery 26, a communication medium interface (e.g., antenna, wire, etc.) 28, and one or more sensing devices 30. As shown in FIG. 4, the circuit board 24 includes a Central Processing Unit (CPU) 32, communication link unit 34, Random Access Memory (RAM) 36, and I/O port 38. The CPU 32 can be any one of various microprocessors, for example, one that is known as a Vector Microprocessor. In a well-known manner, the CPU 32 accesses the RAM 36 for retrieving, storing and communicating pest detection and control information in accordance with the invention. Using appropriately configured transmitter or receiver, a communication link unit 34 provides a link interface between the sensing unit 12 and the data collector 14. For example, an RF unit can provide a radio interface for communicating information to and from the sensor unit 12 through an antenna that transmits and receives RF signals. In this way, the sensor unit 12 can establish two-way communication for transfer of data. Alternatively, a wired link, for example, one based on the X-10 protocol, unit can be used to connect each sensor unit 12 to the data collector 14. In one exemplary embodiment, the sensor unit 12 uses the receiver for receiving a request for information over the communication link. Based on the request and under the control of the CPU, the transmitter can transmit the physical characteristic data on demand, or it can transmit the physical characteristic data periodically, in predefined intervals. Accordingly, the sensor unit 12 can execute a software for translating messages using a defined Application Programming Interface (API). The sensor unit 12 can also prioritize the pest or bait or environmental condition related messages for transmission over the communication link.

Figure 5:
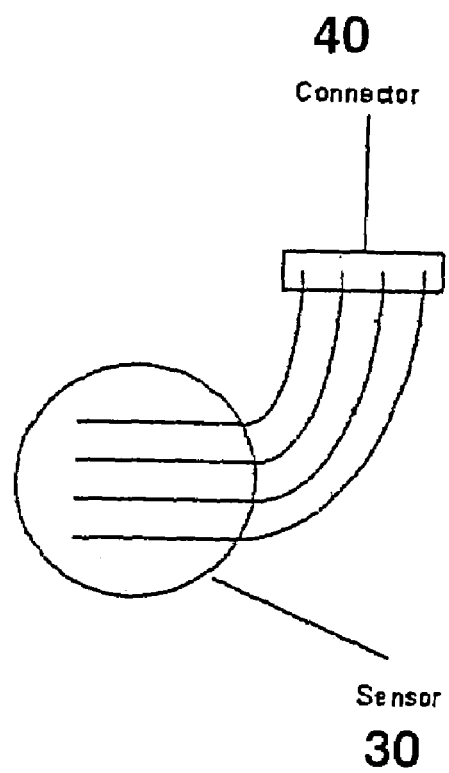
FIG. 5 illustrates the printed circuit of FIG. 4 connected to one or more sensing devices.

As shown in FIG. 5, the printed circuit 24 is connected to the I/O port 38 through a connector 40 that is attached to one or more sensing devices 30. The sensing devices are used for remote sensing of physical characteristics of pests as well as baits or environmental conditions. As described herein, bait comprises means, such as any attractant (e.g., food source, pheromone, etc.) that provides adequate pesticide (e.g., insecticide or rodenticide) exposure to and for a pest that would be detected by the system. In general, the bait can be any attractant that is used for attracting and terminating a targeted pest type of any kind, including insects, rodents, ants, roaches, etc. An example of bait that can be used in connection with the present invention is granular, gel, liquid, or solid baits.

In one exemplary embodiment, the sensing device 30 can be an optical sensor or camera. One such camera is a CCD camera that is programmable to take a snapshot of a subject area in millisecond-range intervals. This type of sensor provides digital images based on which the width, length, height or speed of an object, such as a pest, can be detected. In another exemplary embodiment a pressure-sensing device, such as a scale or a load cell, can be used to measures mass changes in milligram resolutions. In general, the sensing device 30 can be any transducer that generates an electrical signal in accordance with a physical characteristic of any pest or bait or environmental condition. The transducer can generate the electrical signal in connection with to any one or combination of weight, length, width, height, volume, scent, noise, acoustic, speed, chemistry, temperature, moisture, or density of the pest or bait or environmental condition or other measurable physical characteristic. The generated electrical signal is applied to the CPU, which processes the electrical signal to provide physical characteristic data messages. The CPU can be programmed to appropriately format the physical characteristic data messages so that it can be transmitted over the communication link. An identification module 42 can also be included in the sensor unit 12 for identifying the sensor unit and/or its associated zone.

Figure 6:
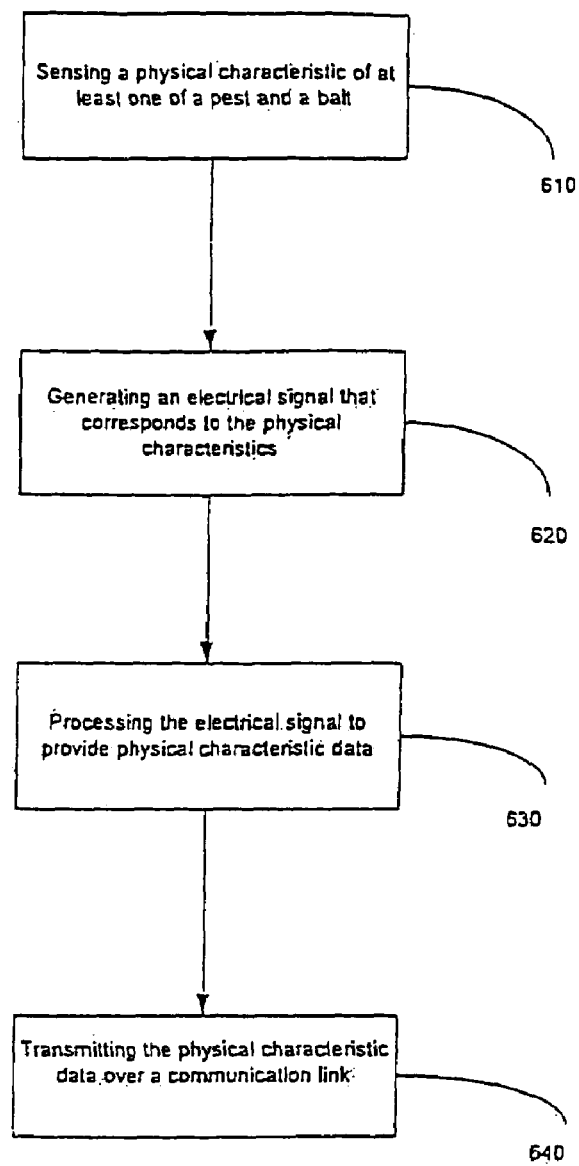
FIG. 6A illustrates a flow chart of a pest management detection method in accordance with the present invention.
Figure 6B:
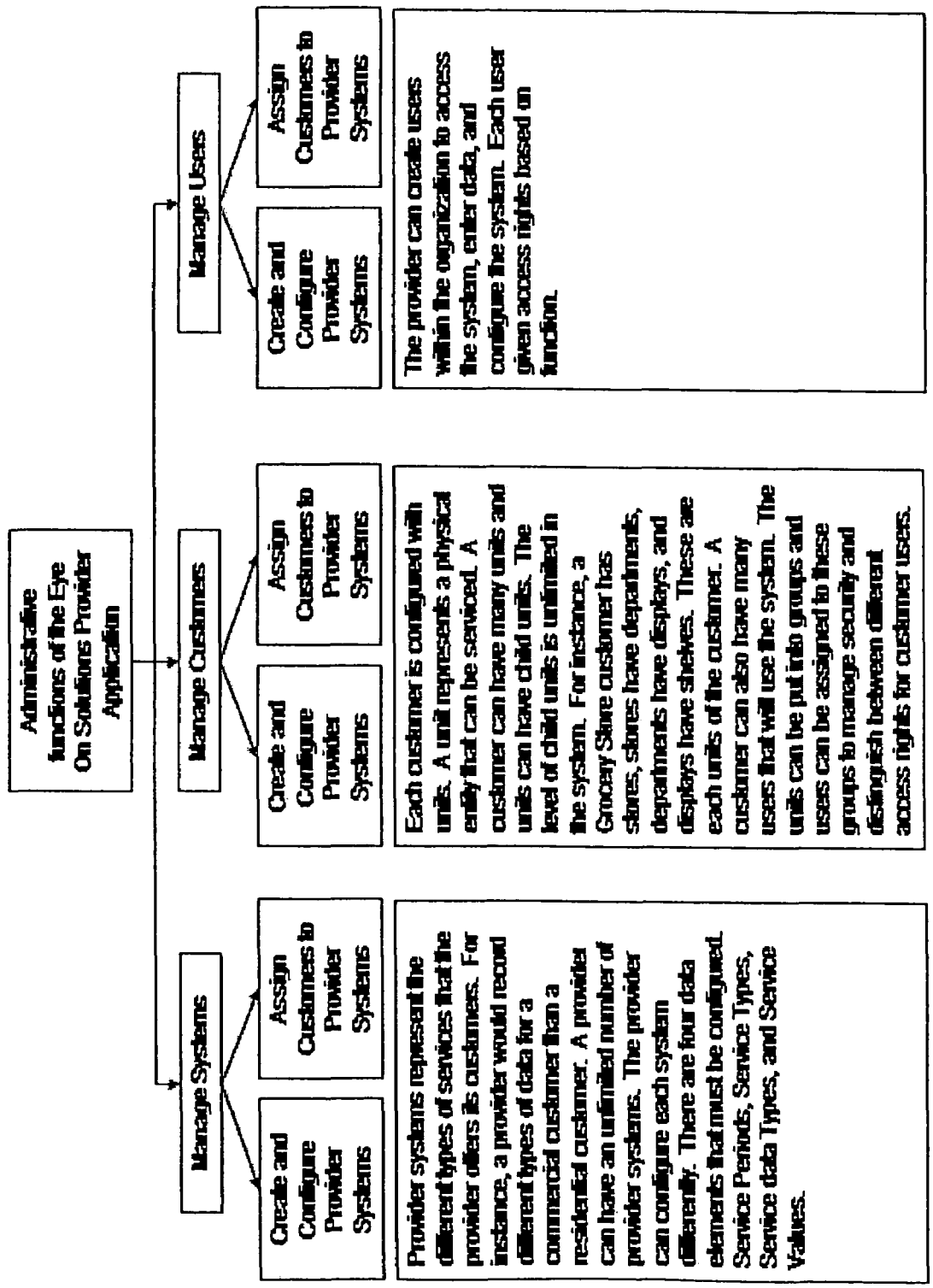
Figure 7A:
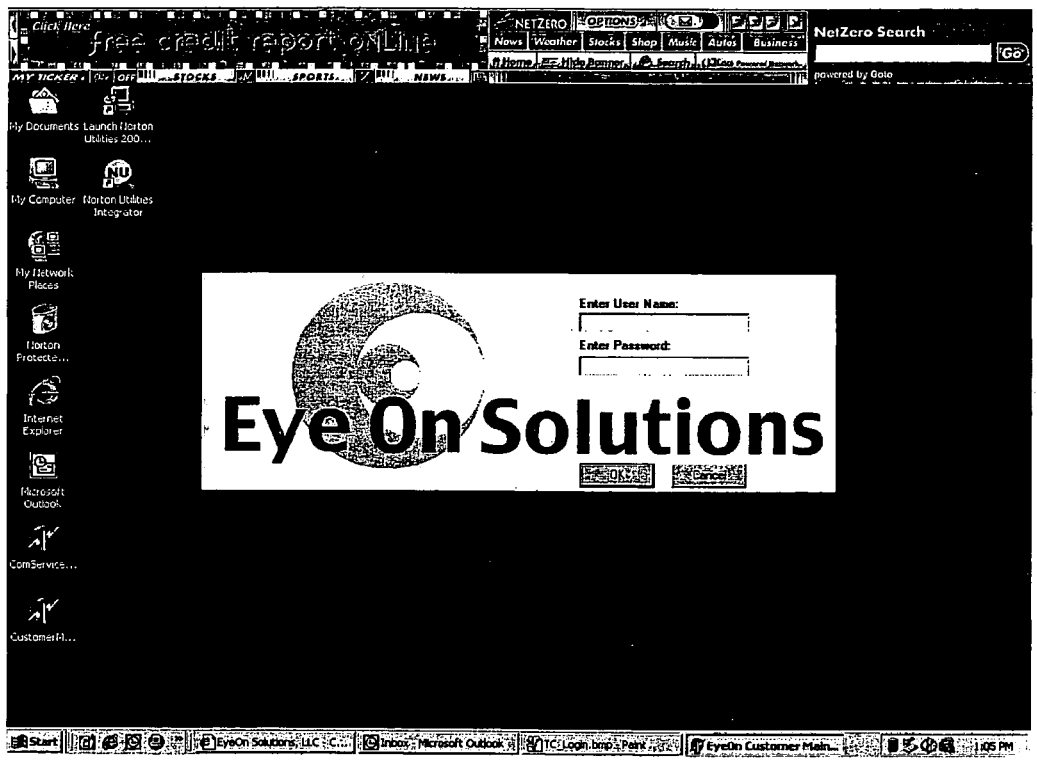
Figure 7B:
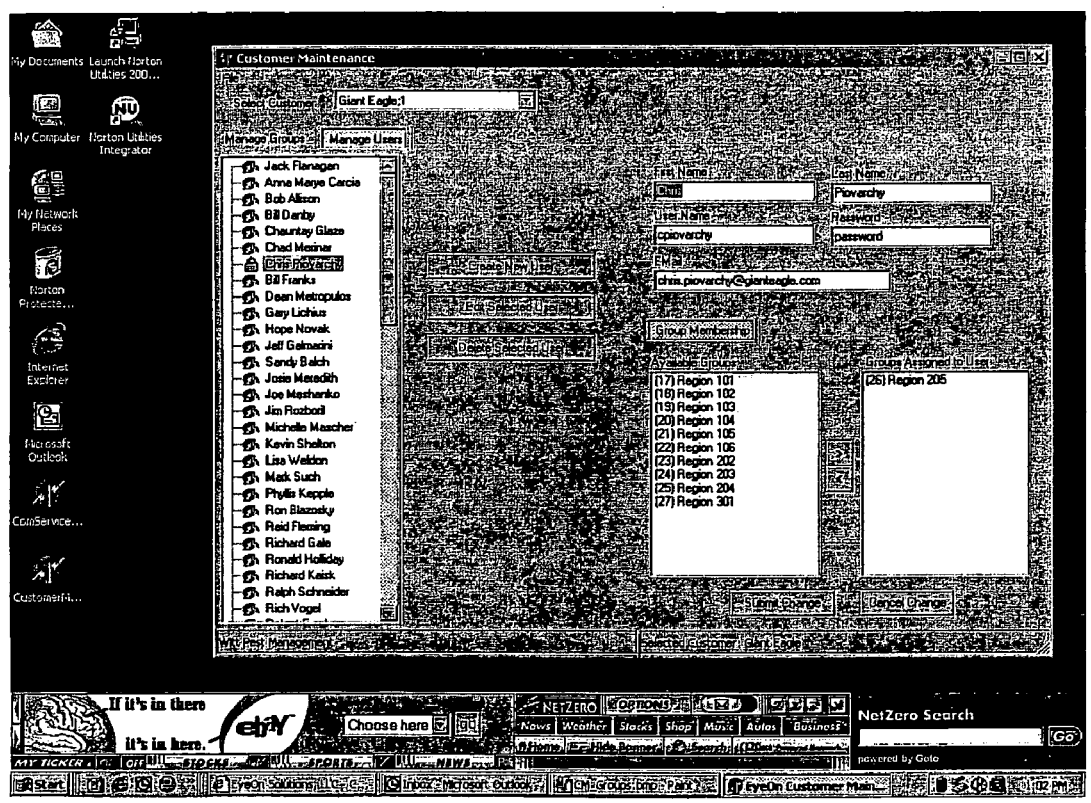
Figure 7C:
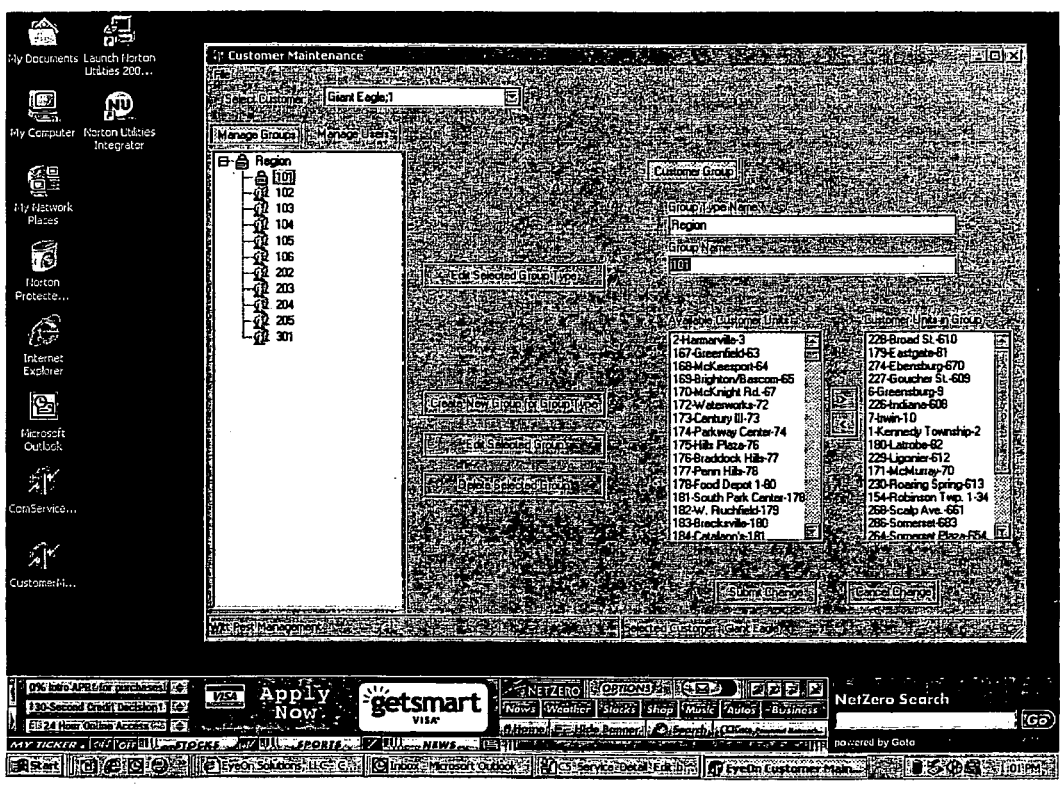
Figure 8A:
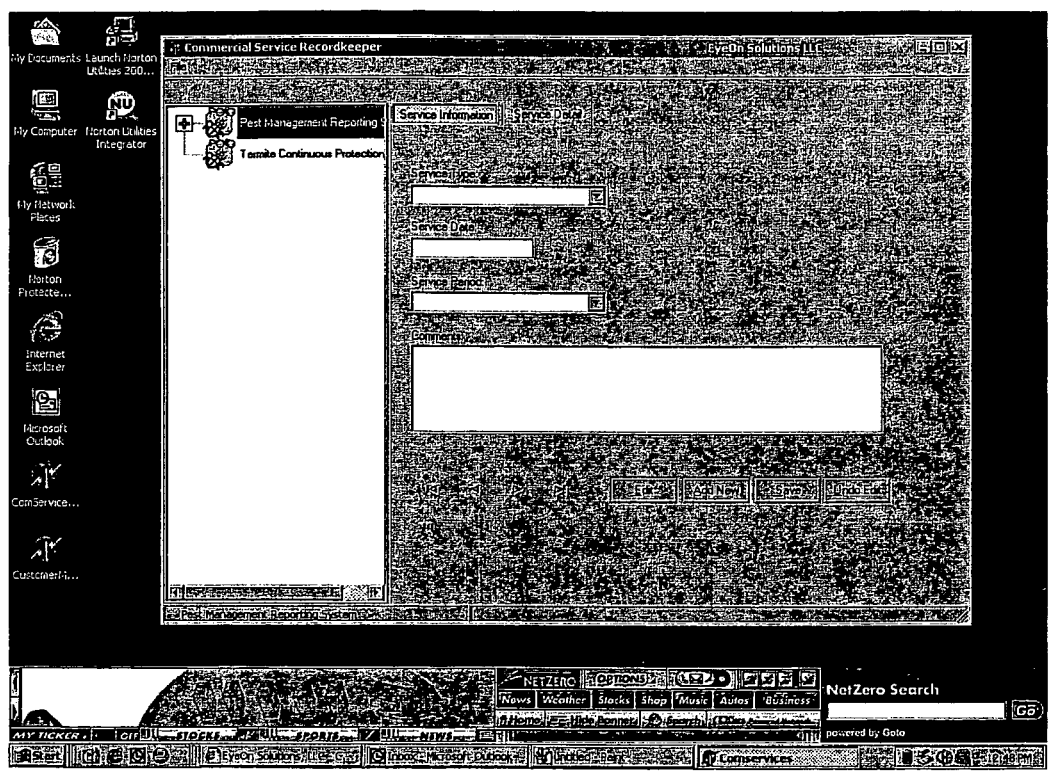
Figure 8B:
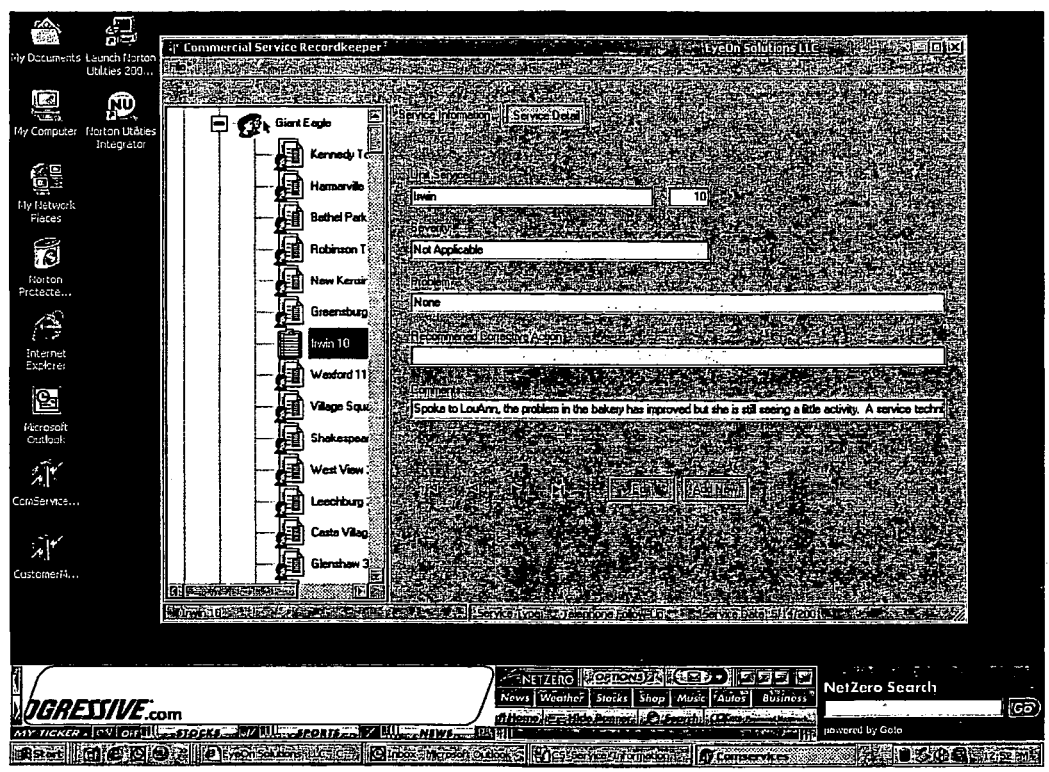
Figure 8C:
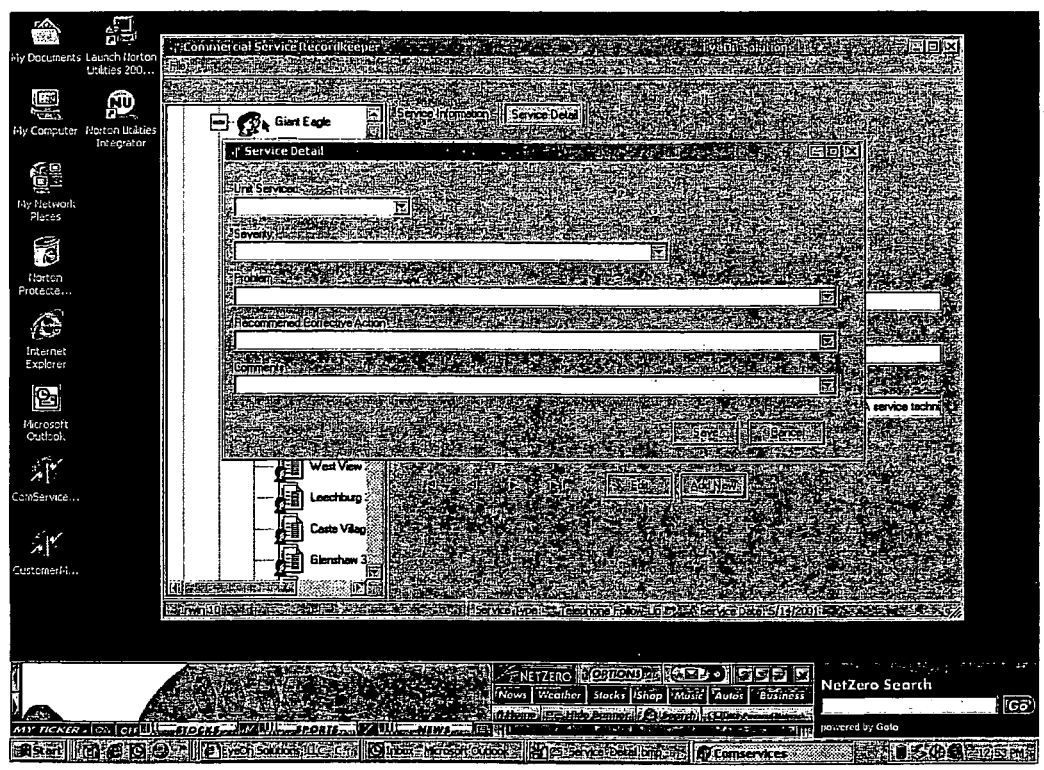
Figure 8D:
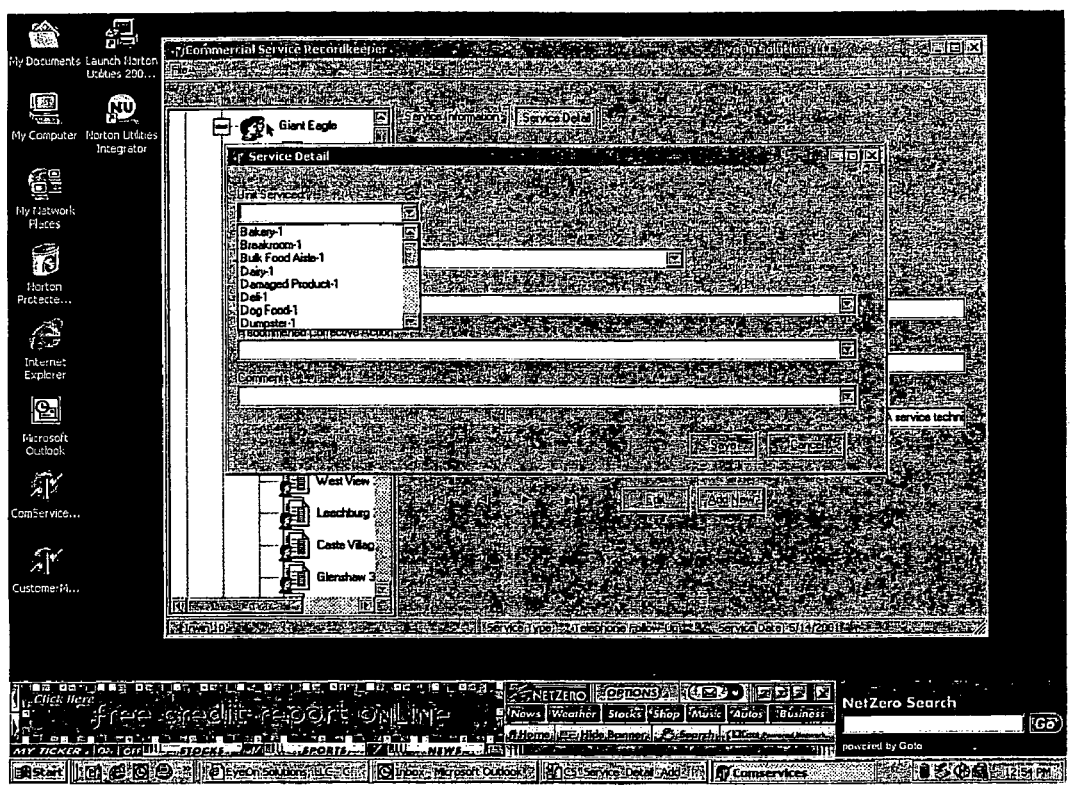
Figure 8E:
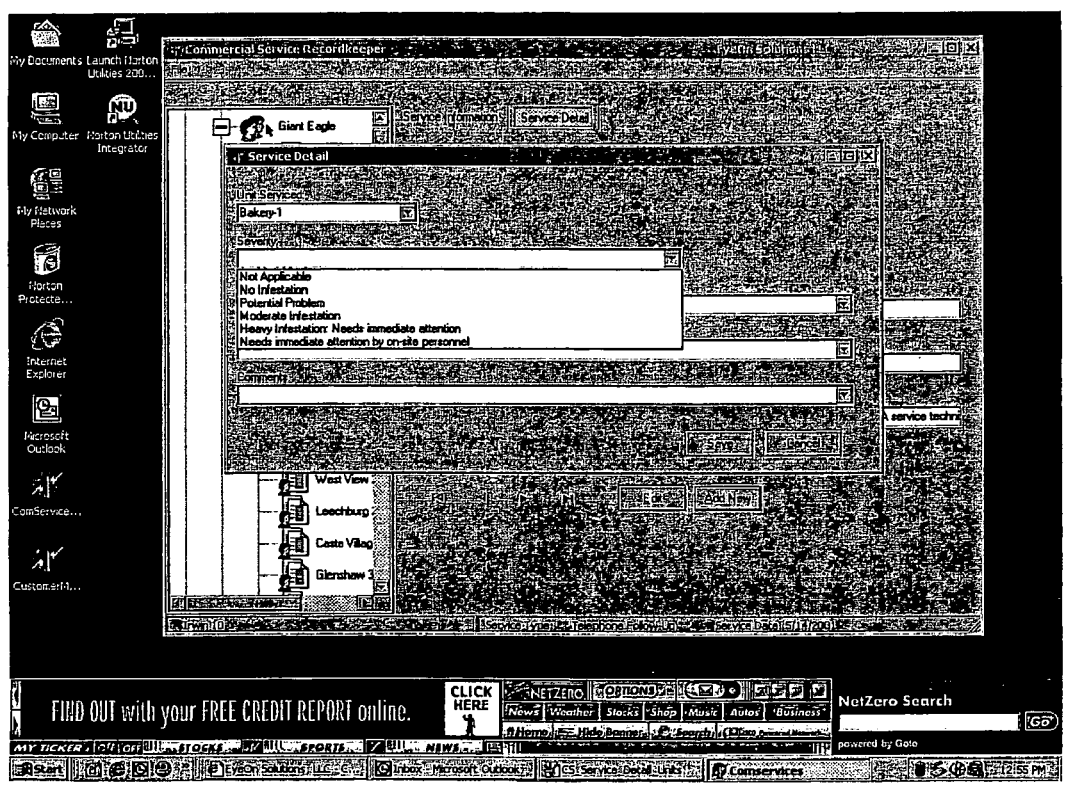
Figure 8F:
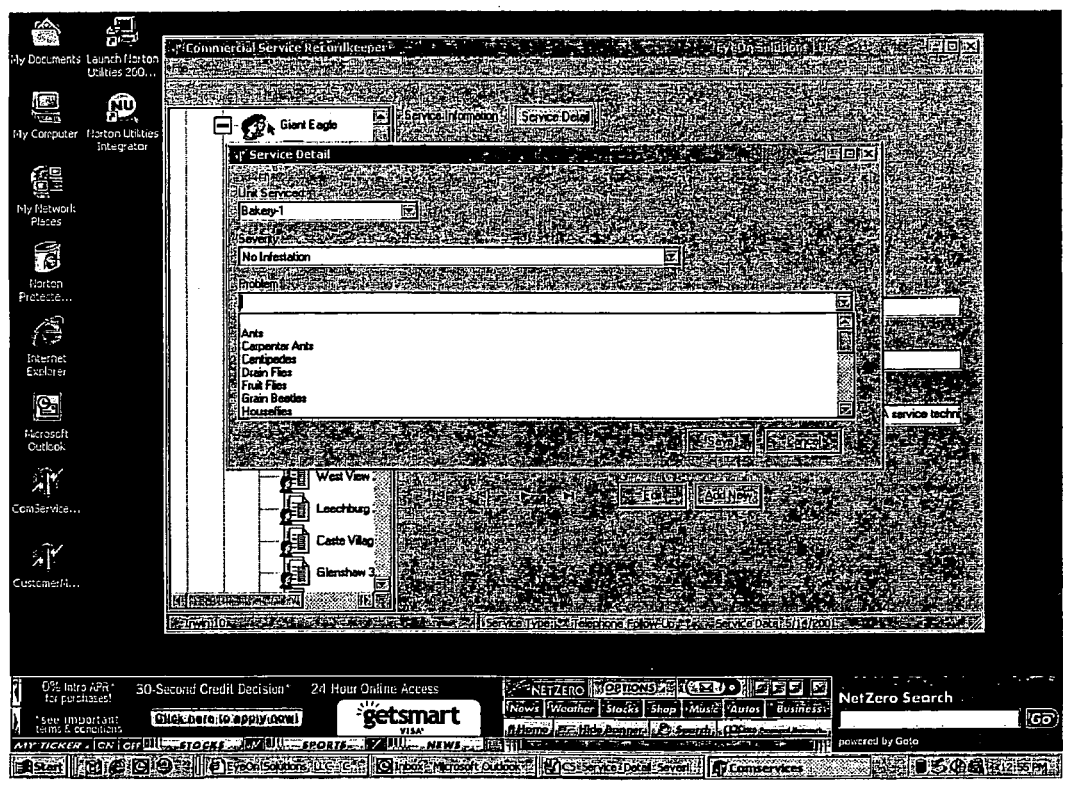
Figure 8G:
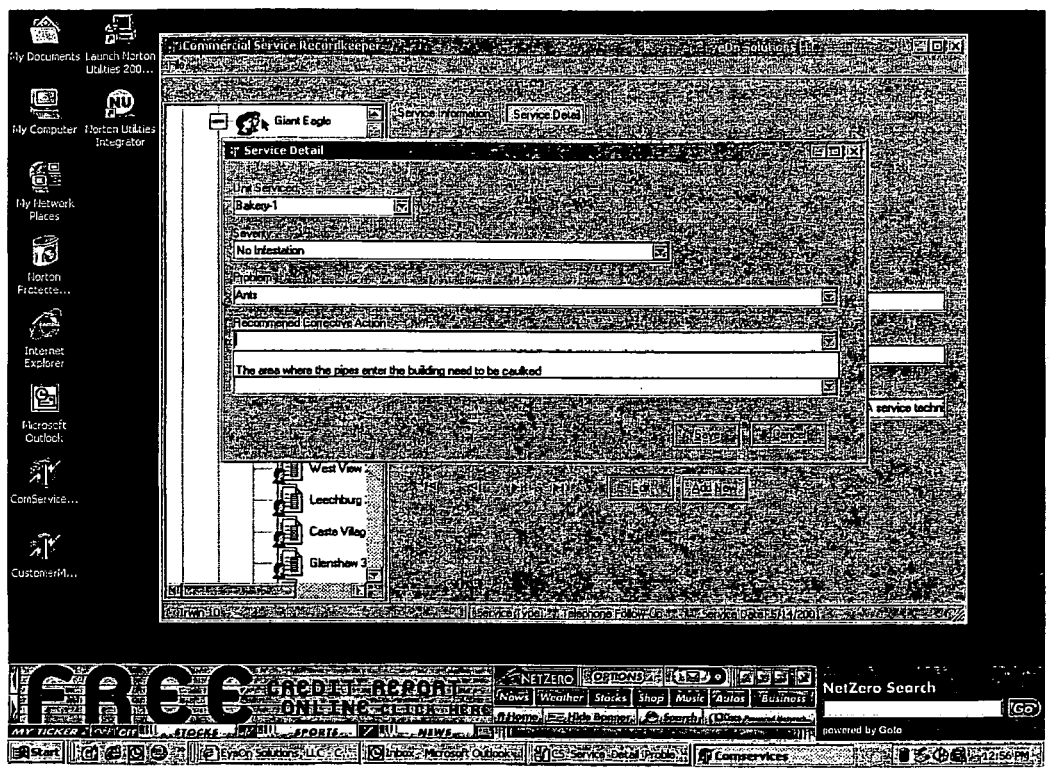
Figure 8H:
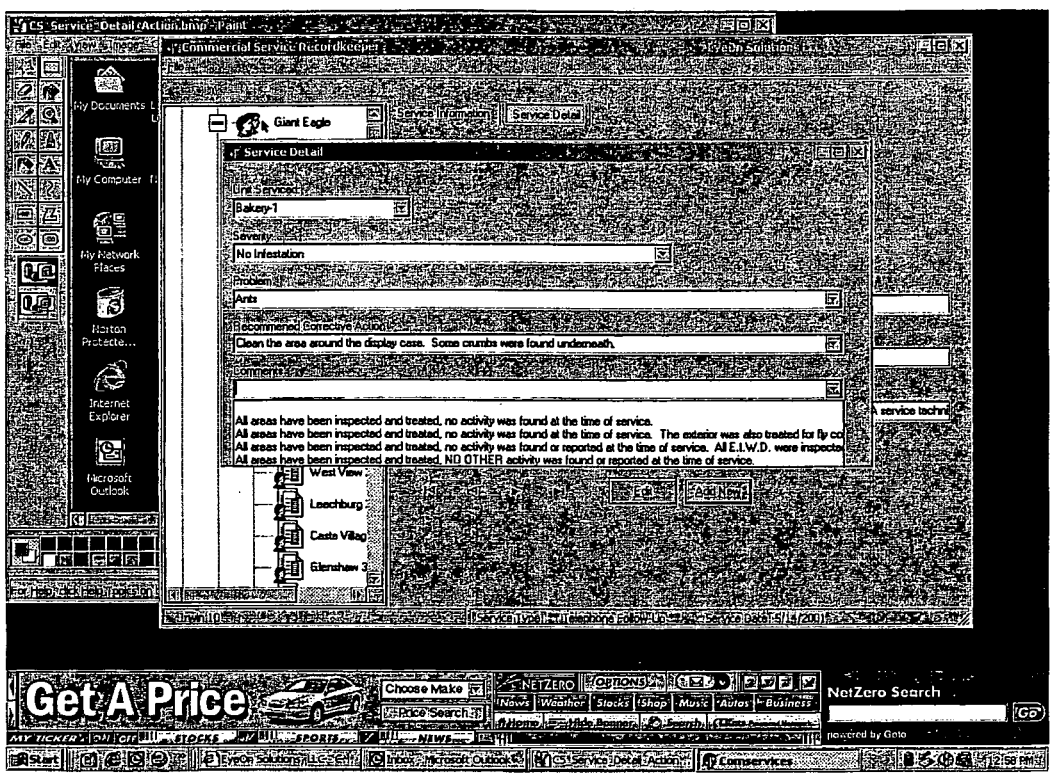
Figure 8I:
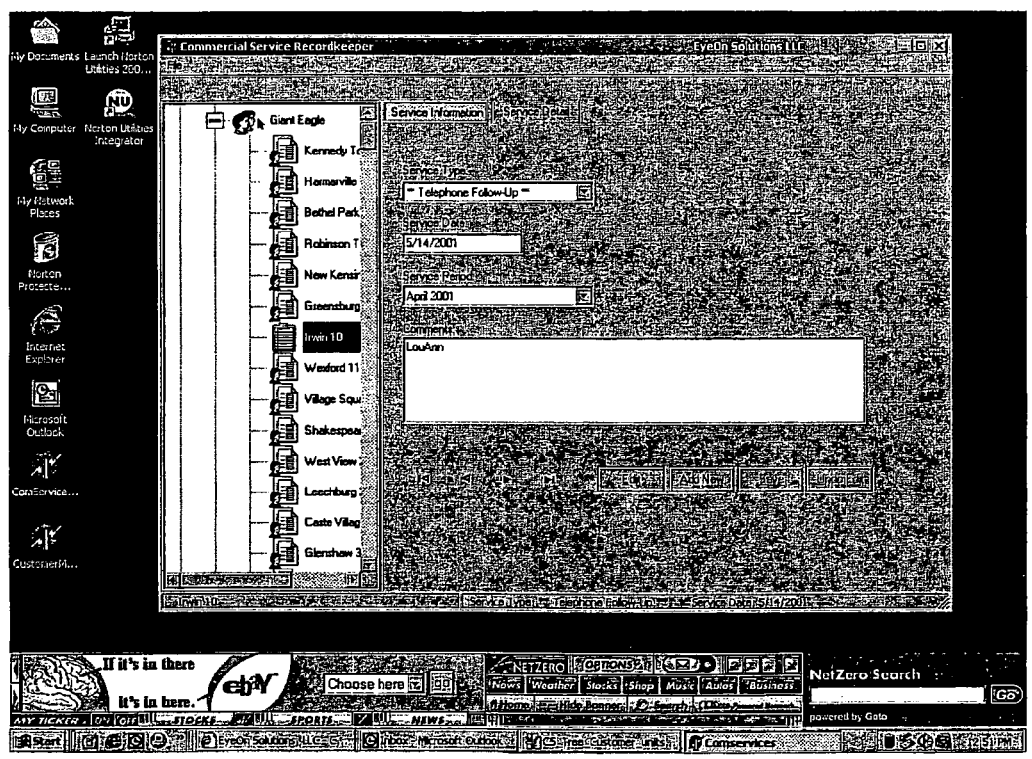
Figure 8J:
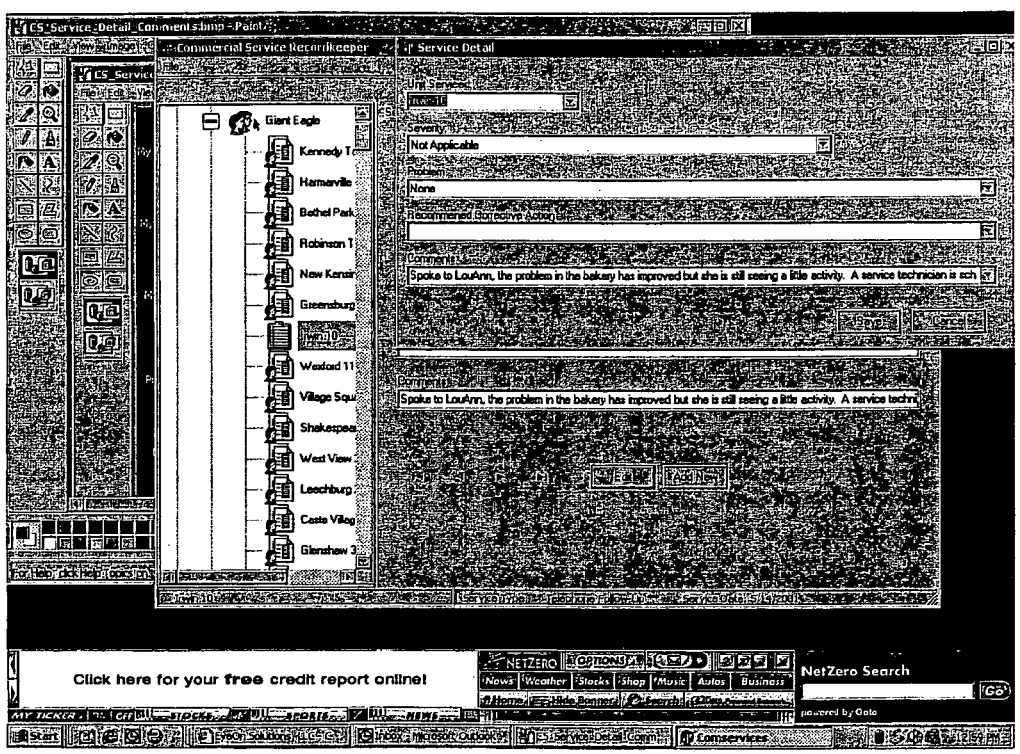
Figure 9A:
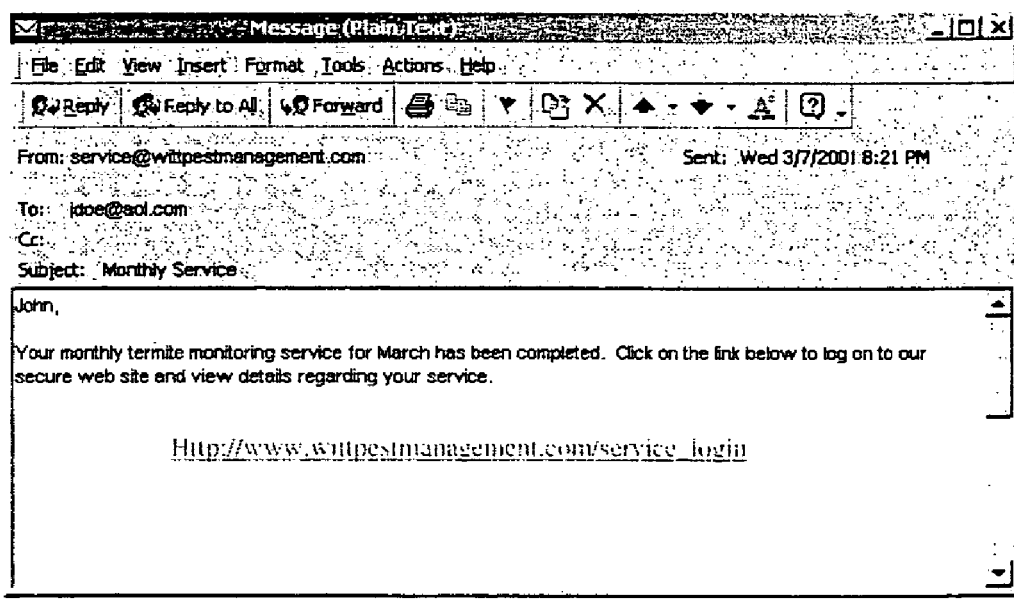
Figure 9B:
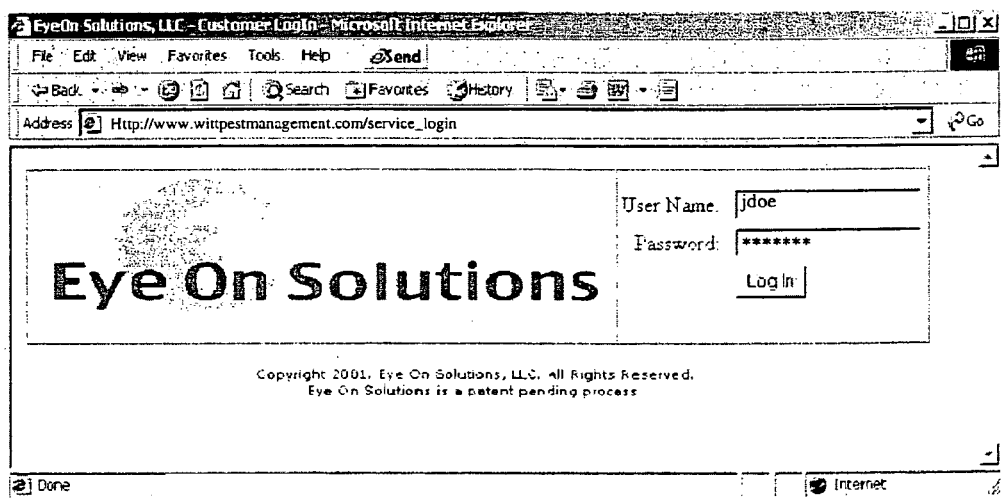
Figure 9C:
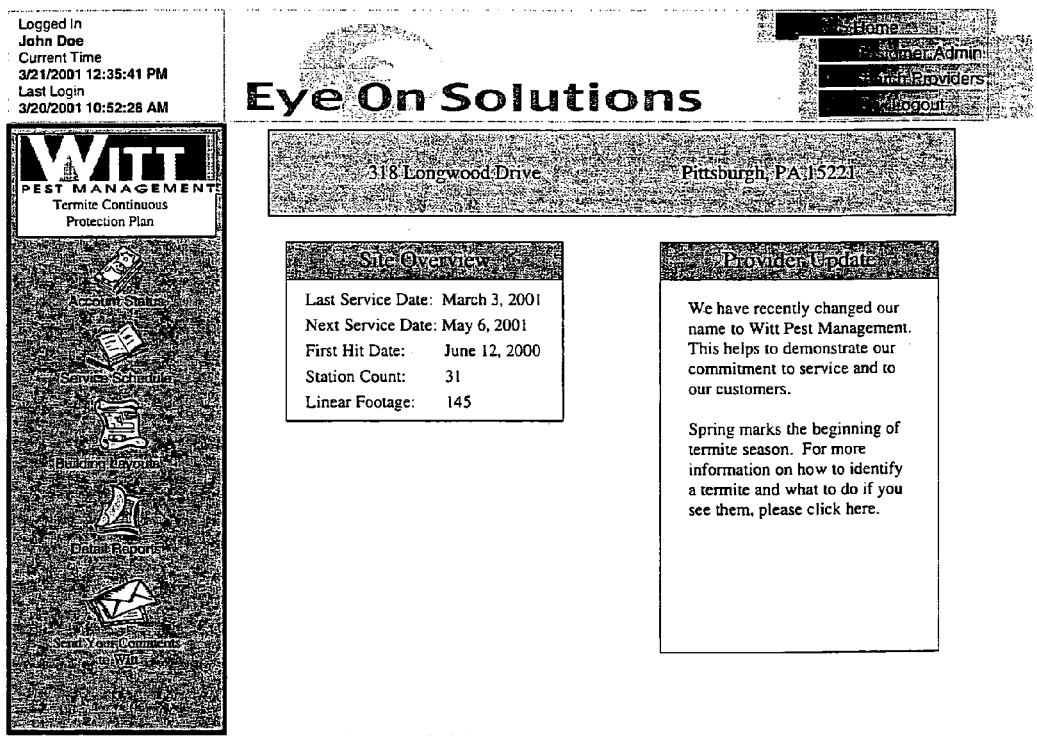
Figure 9C:
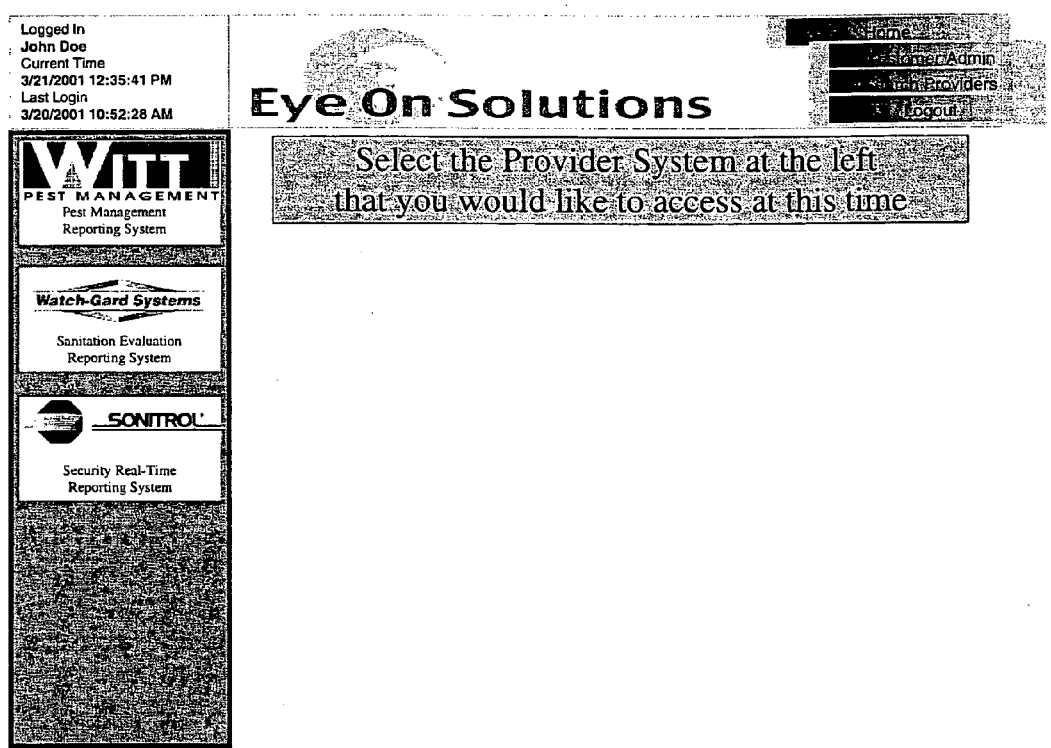
Figure 9D:
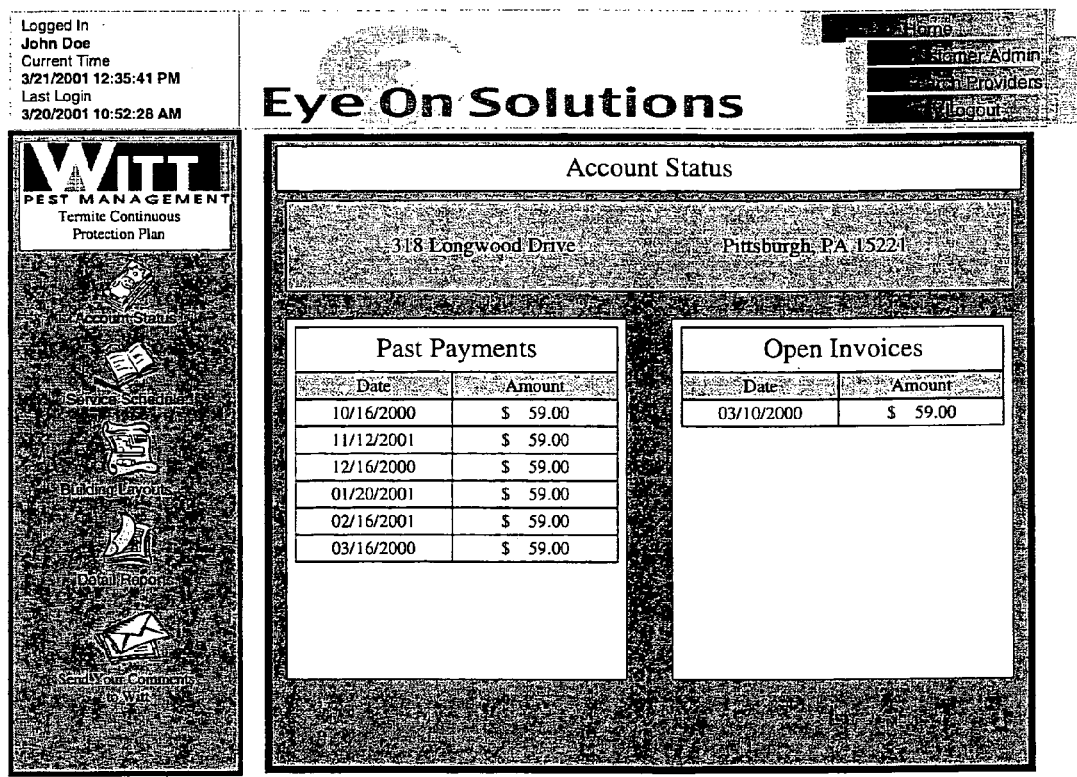
Figure 9E:
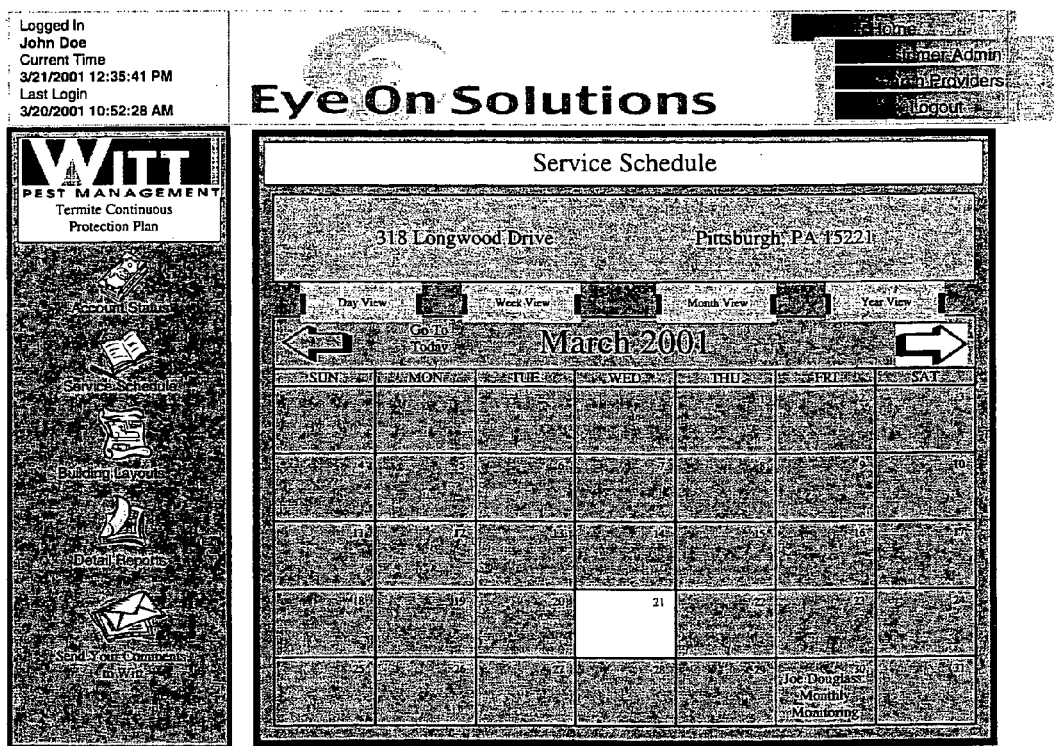
Figure 9F:
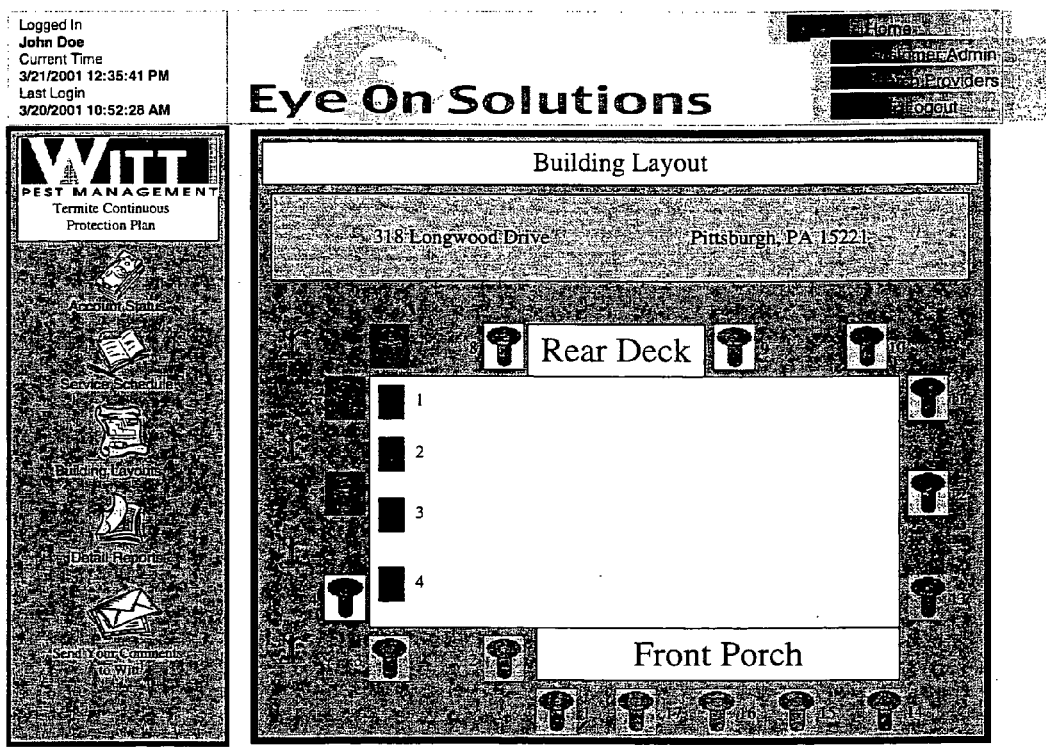
Figure 9G:
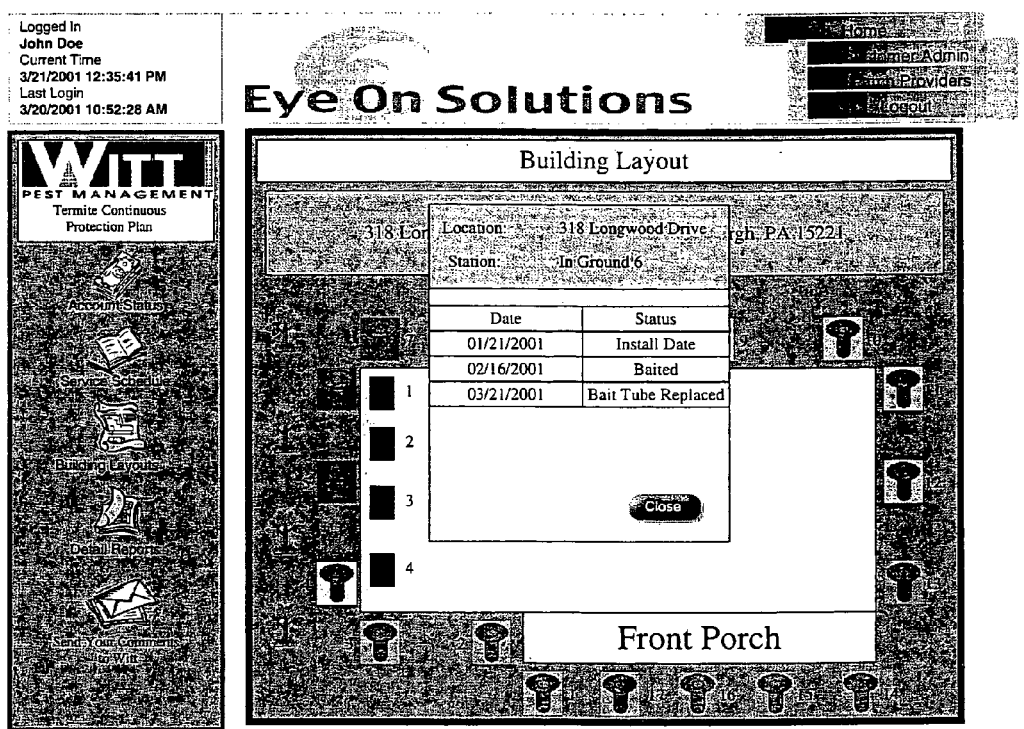
Figure 9H:
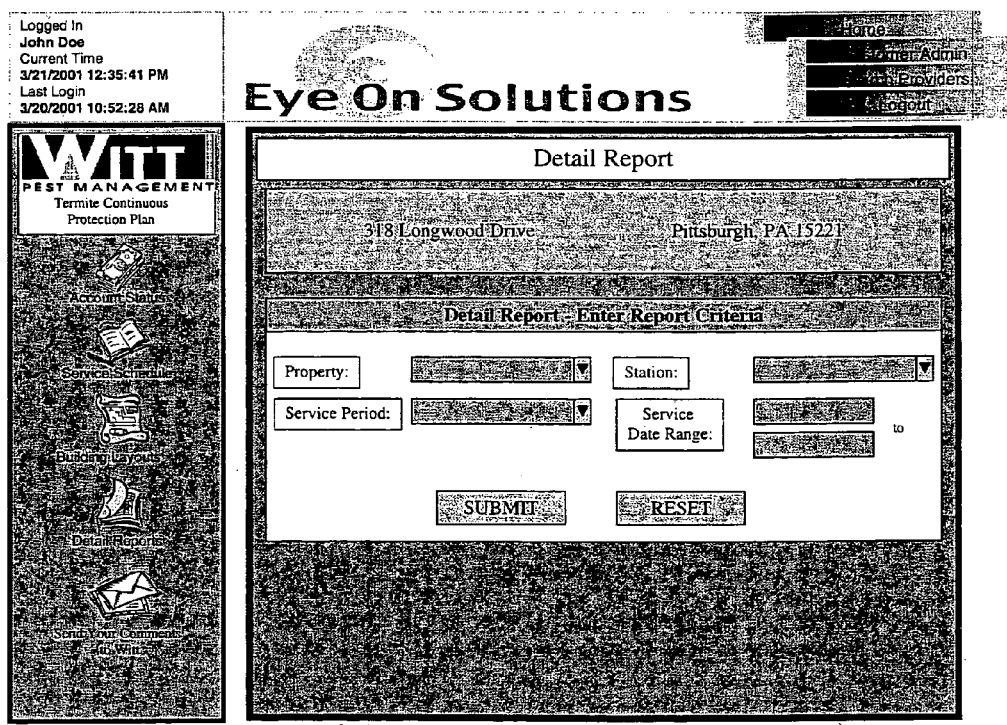
Figure 9I:
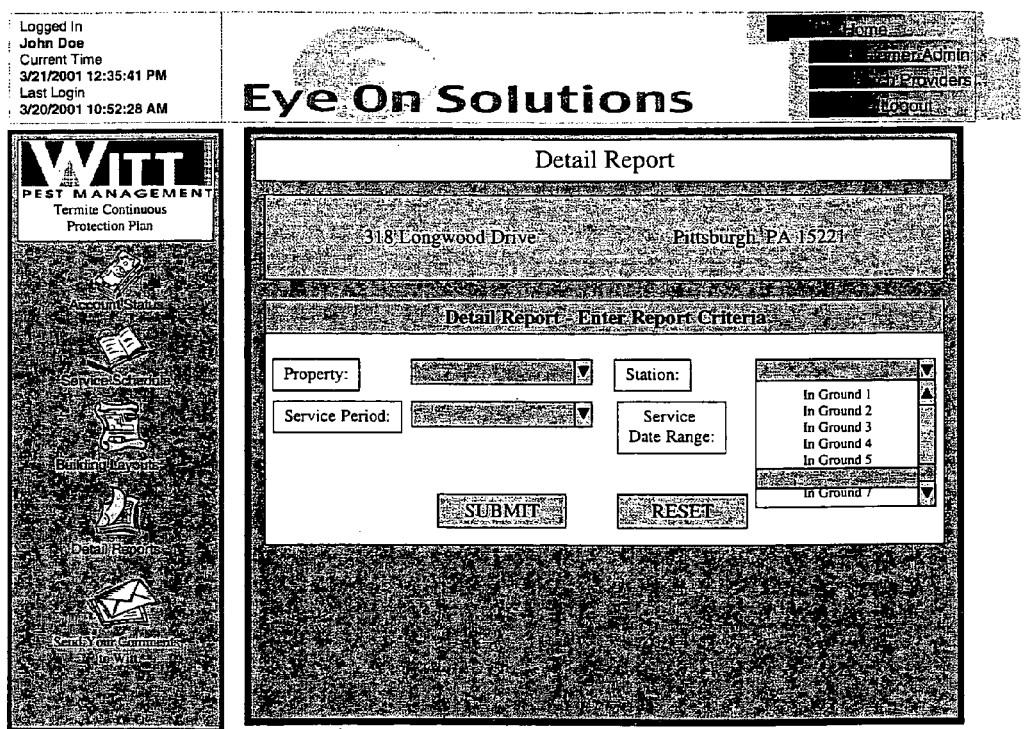
Figure 9J:
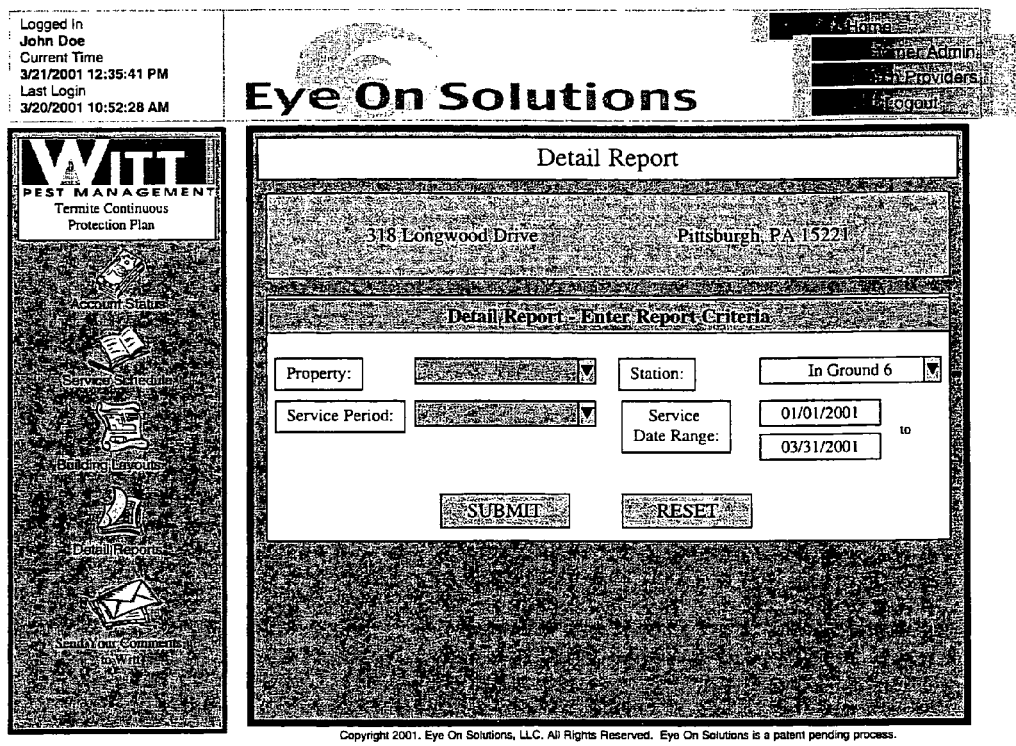
Figure 9L:
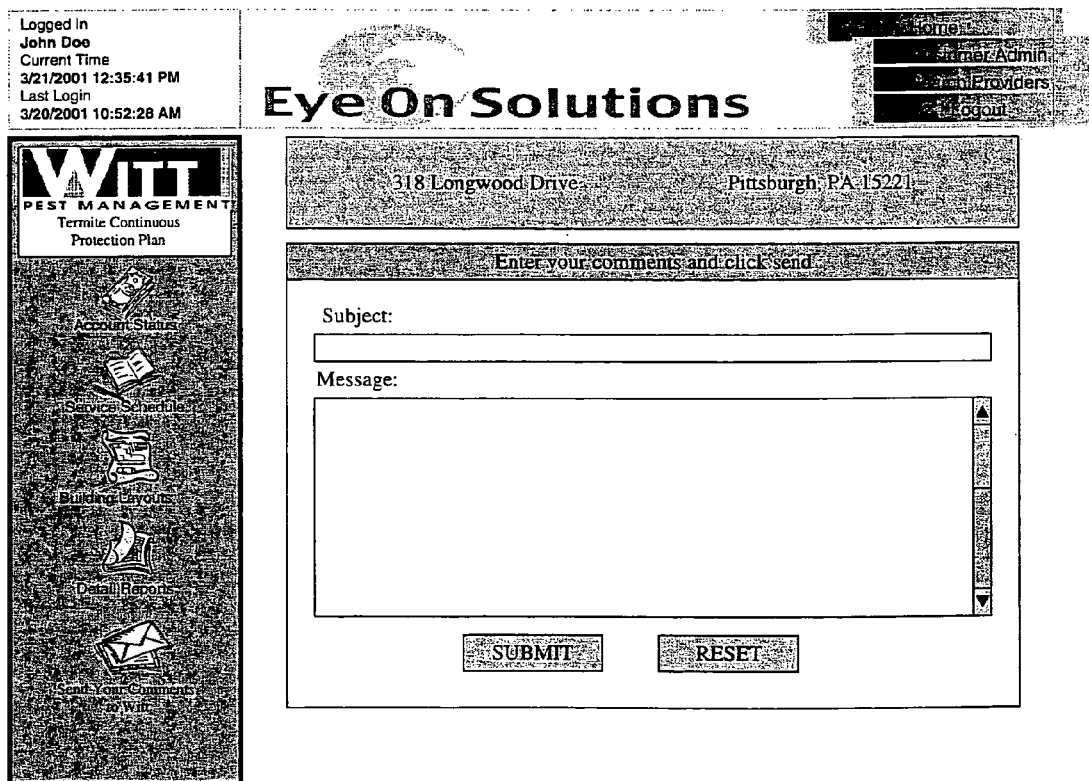
Figure 10A:
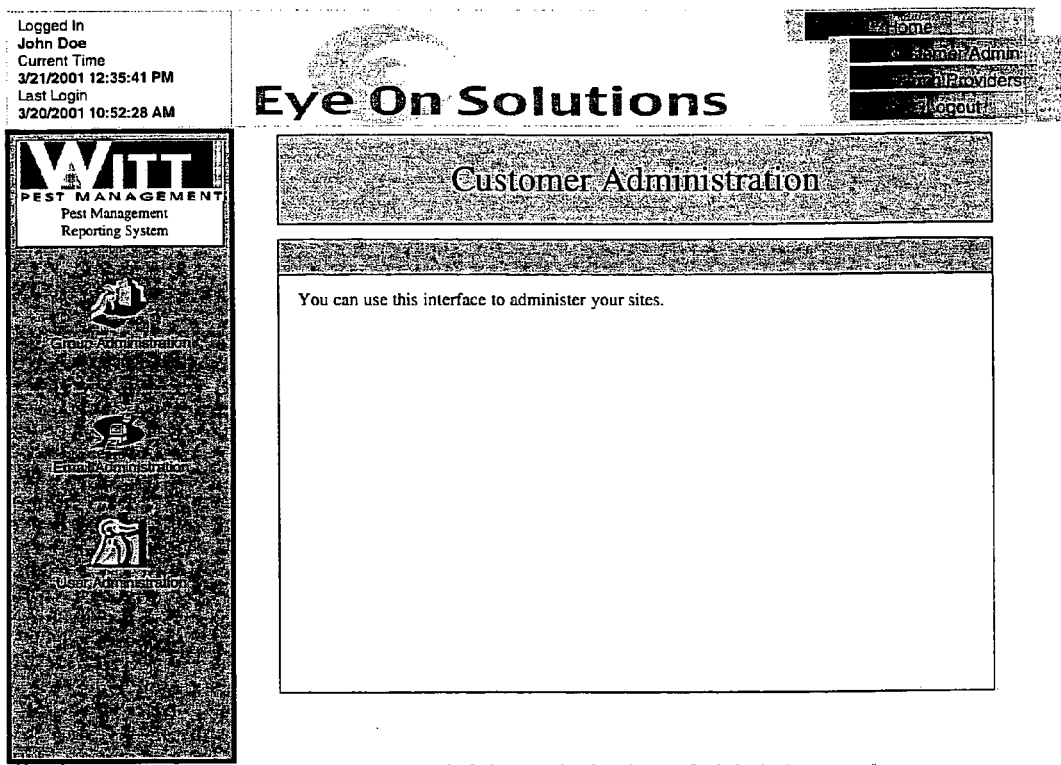
Figure 10B:
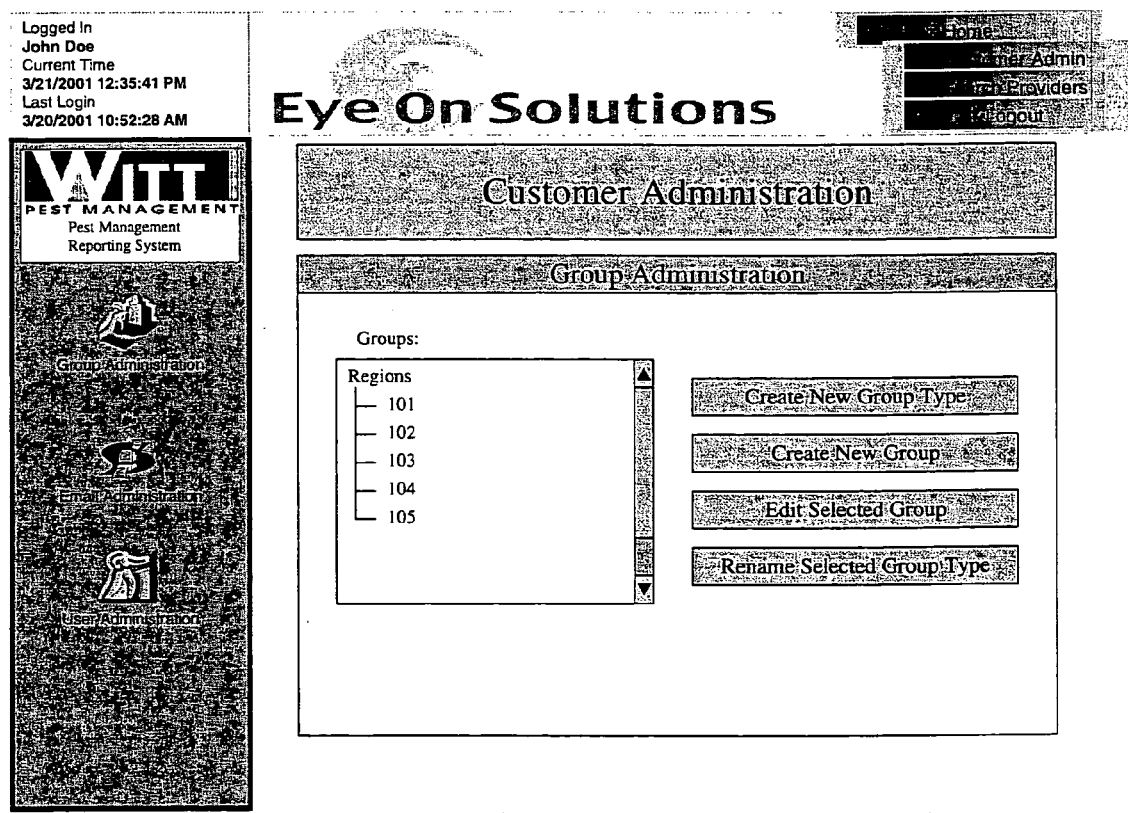
Figure 10C:
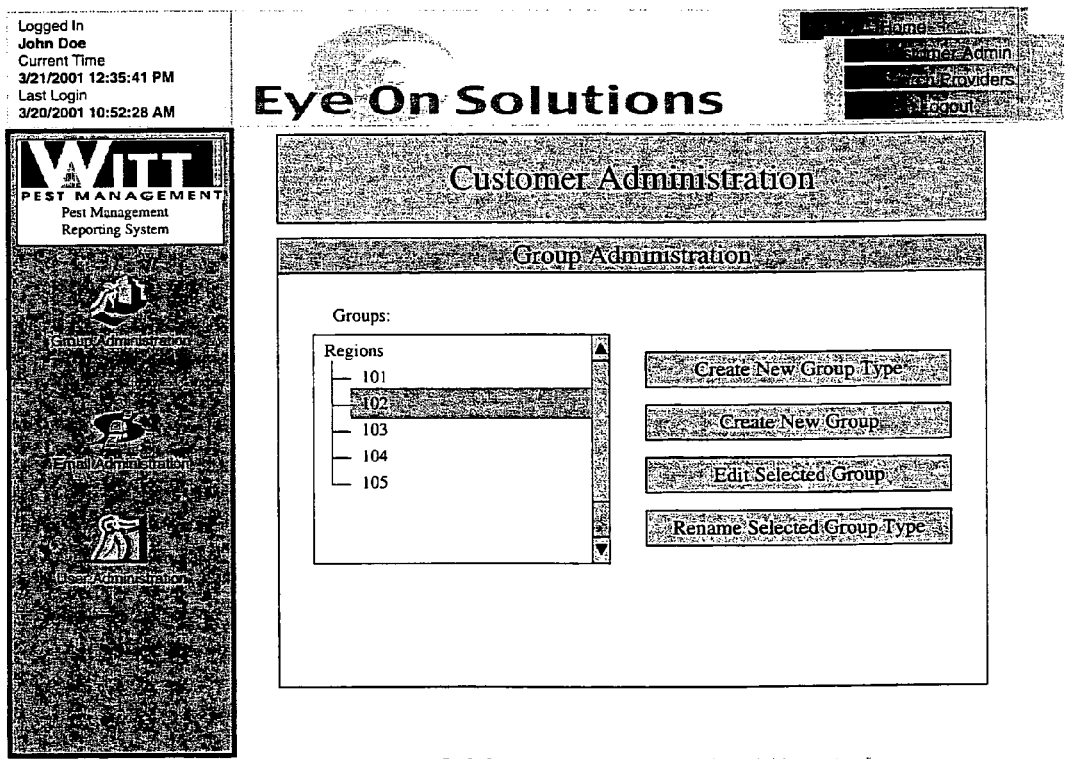
Figure 10D:
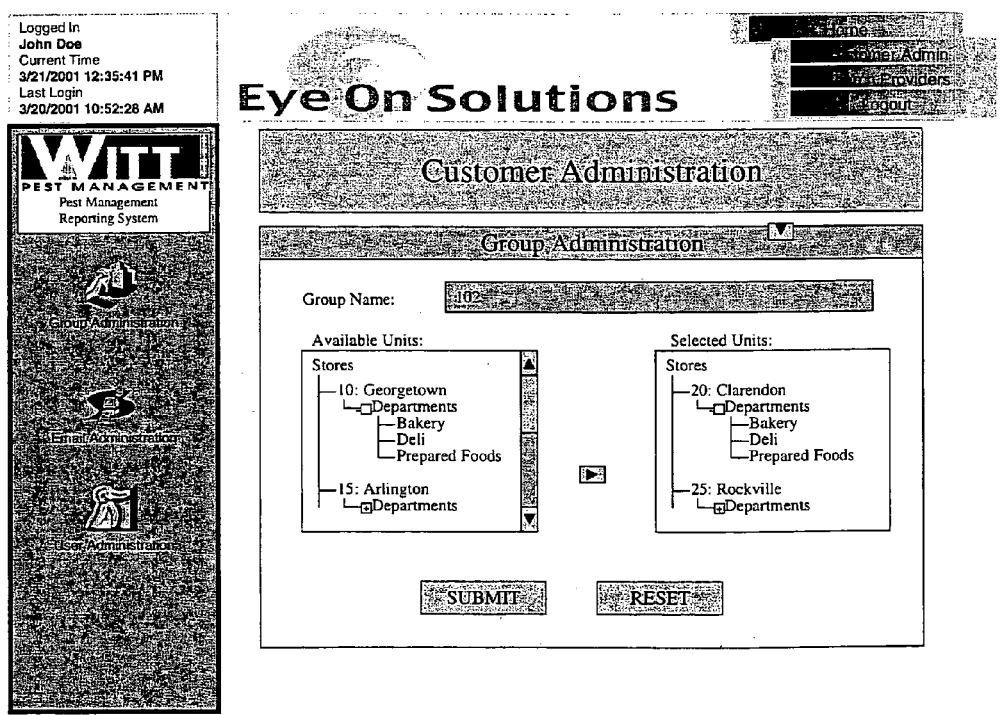
Figure 10E:
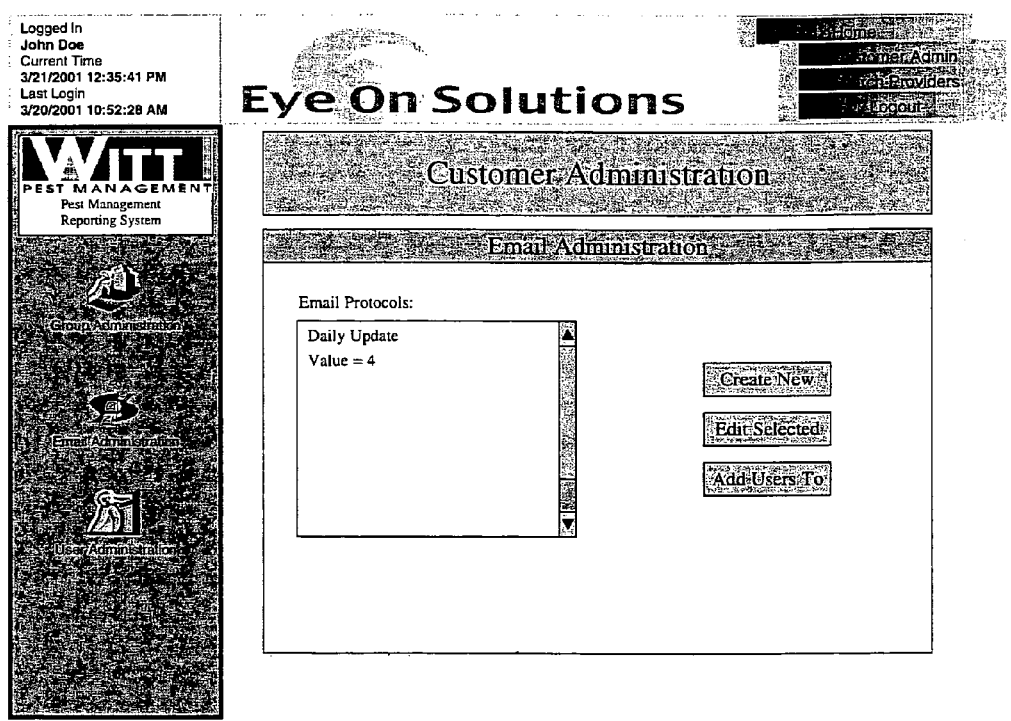
Figure 10F:
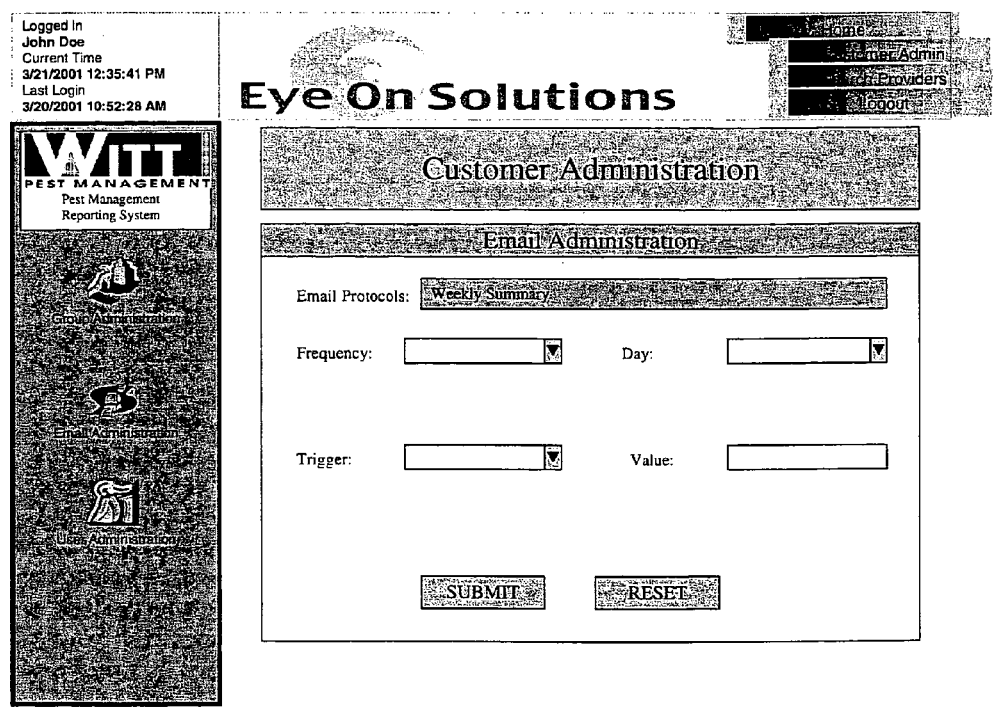
Figure 10G:
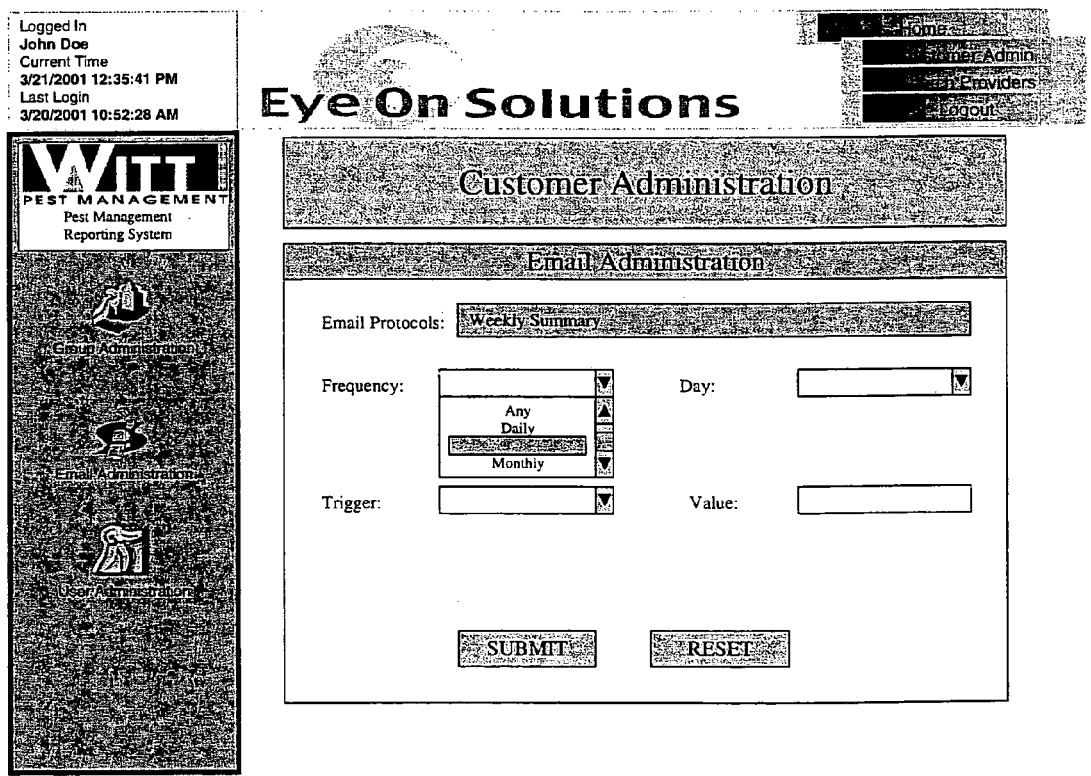
Figure 10I:
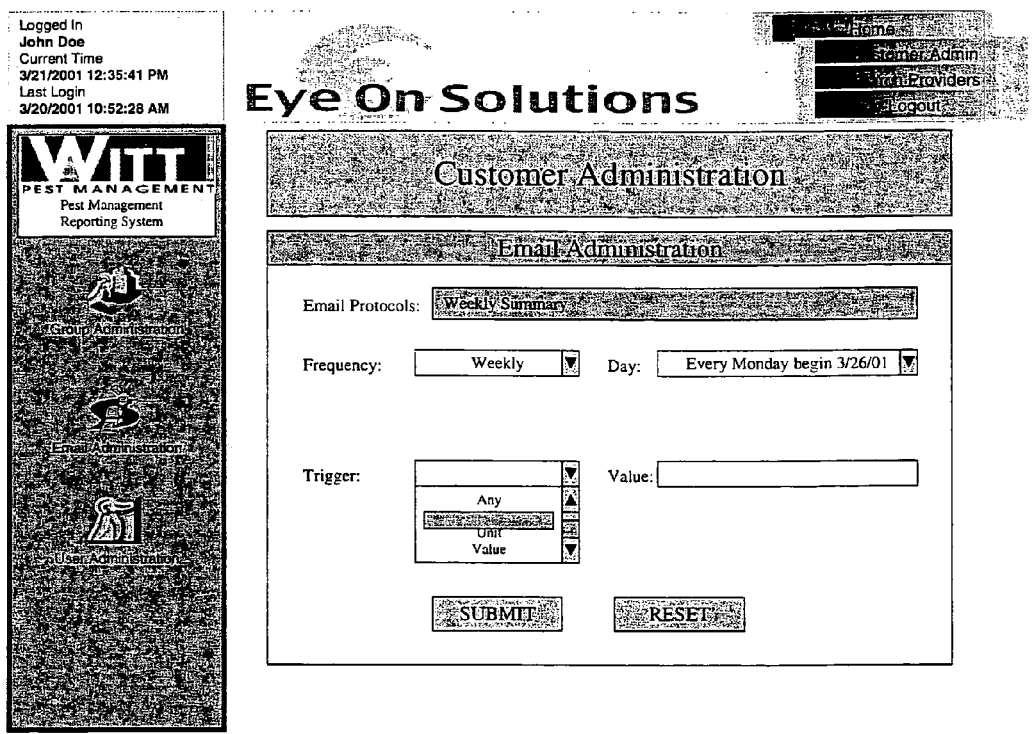
Figure 10J:
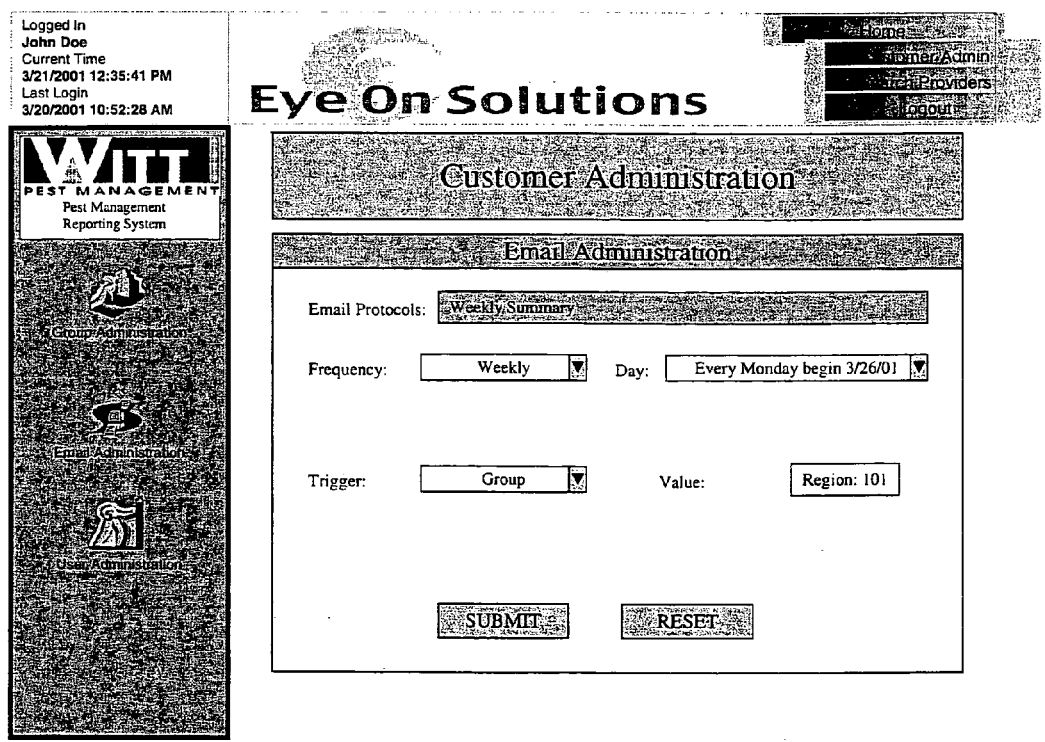
Figure 10K:
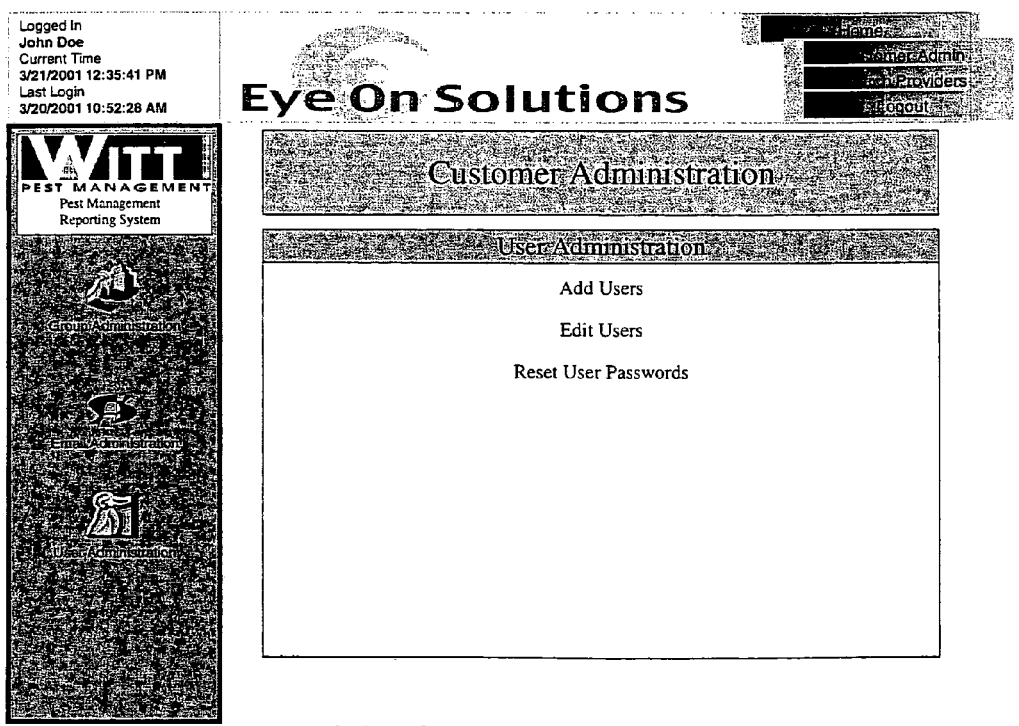
Figure 10N:
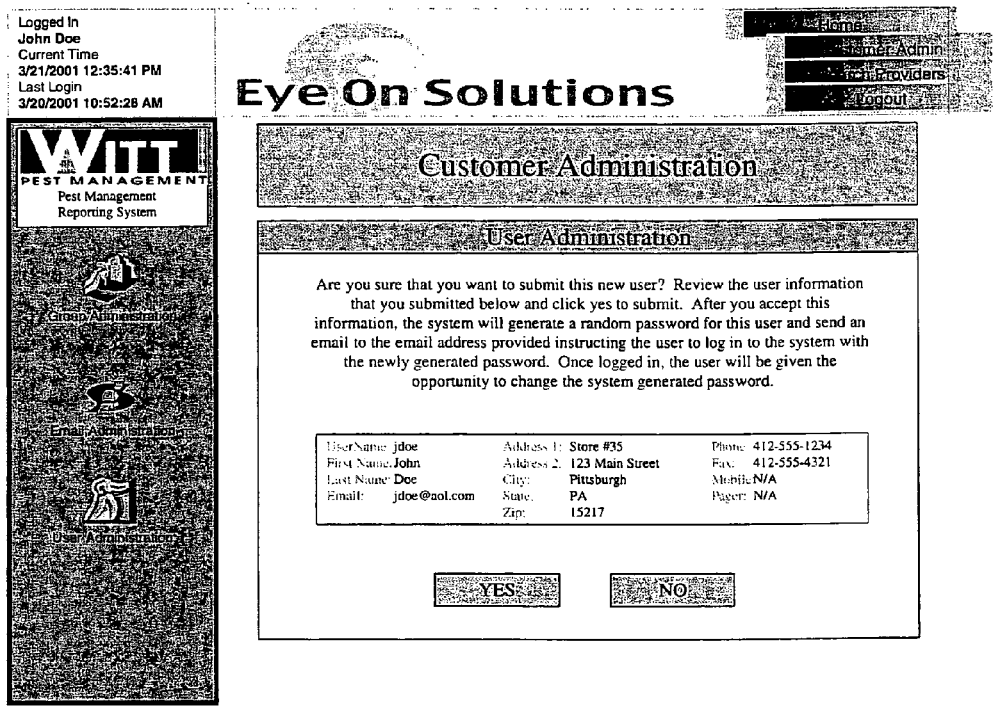
Figure 10O:
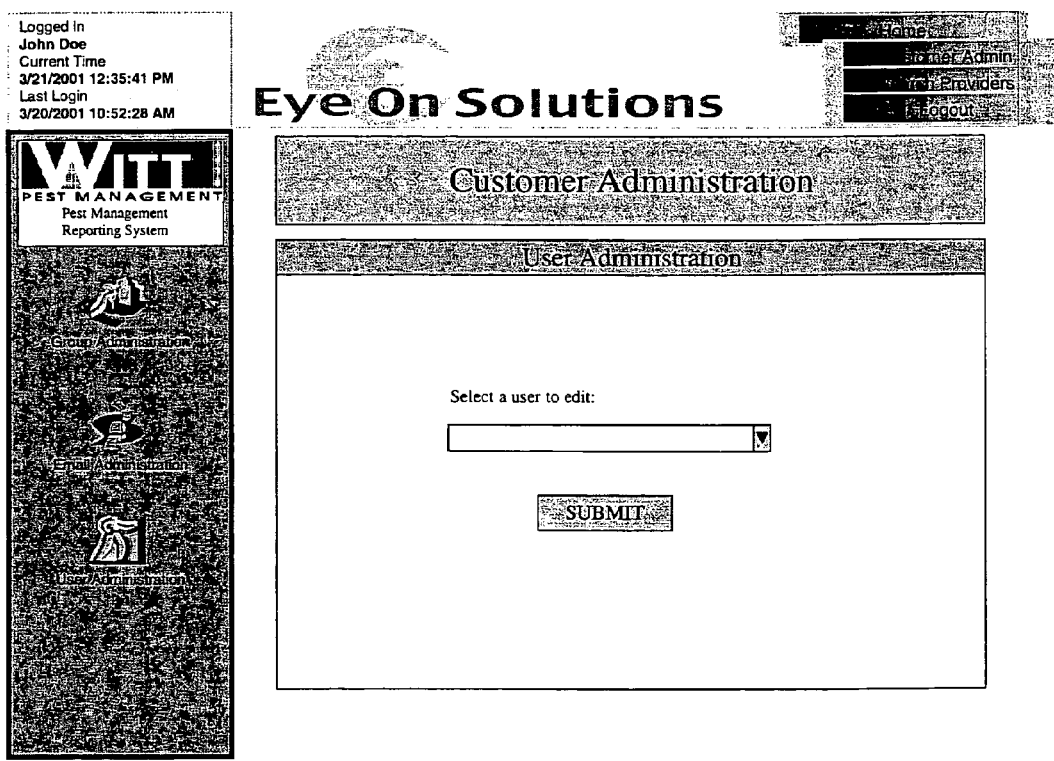
Figure 10P:
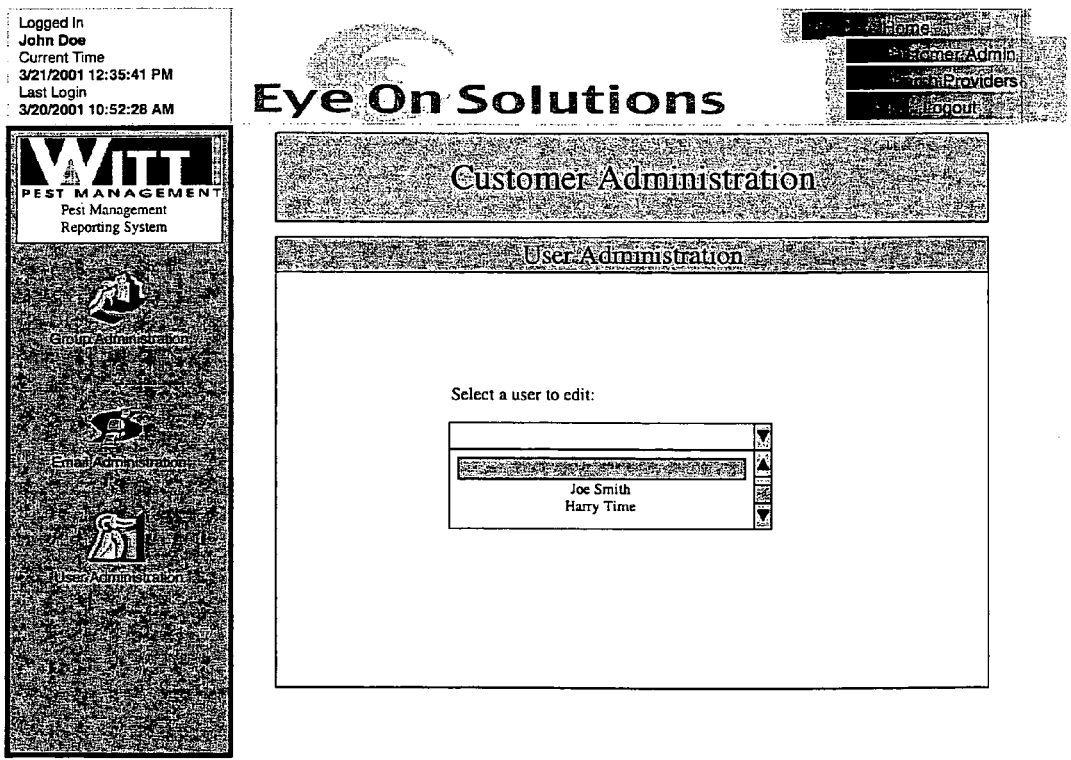
Figure 10Q:
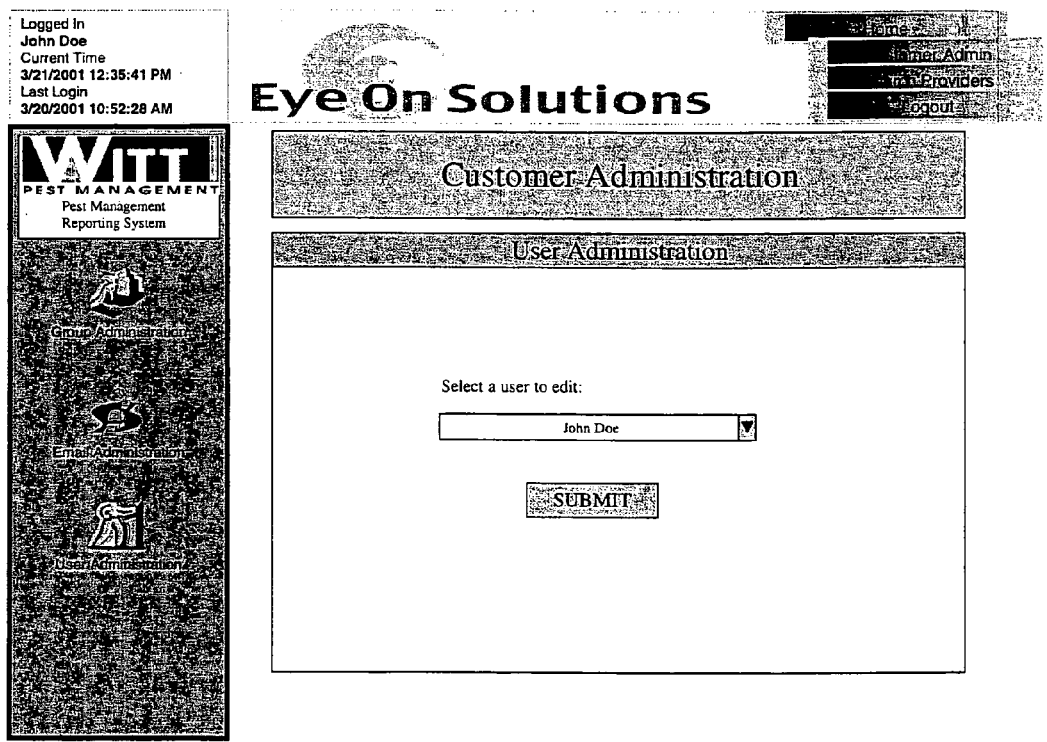
Figure 10S:
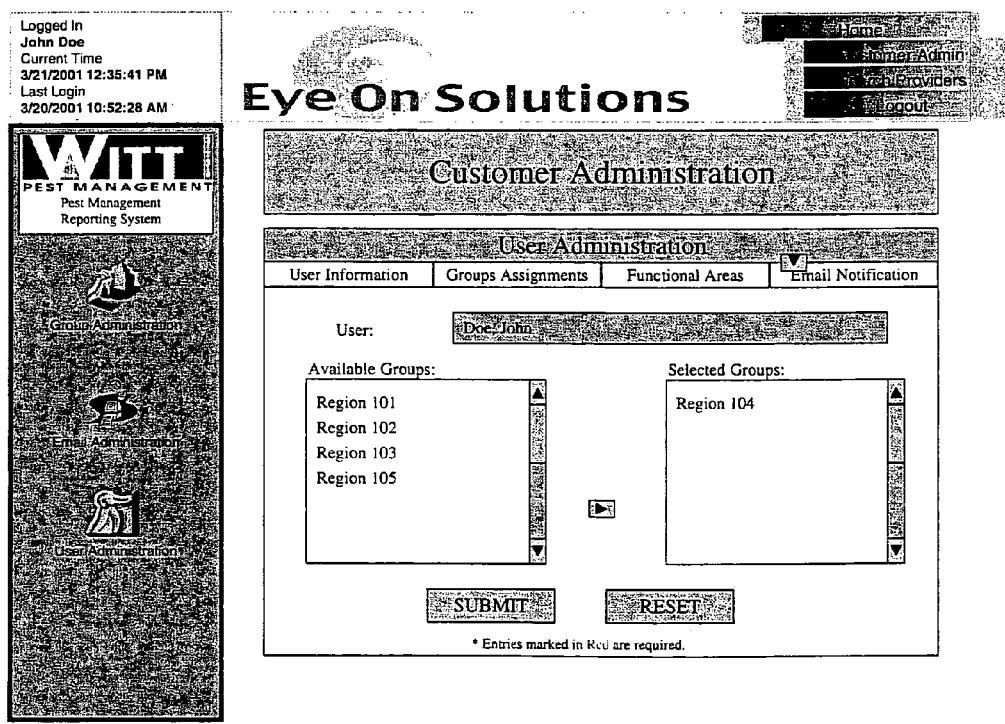
Figure 10T:
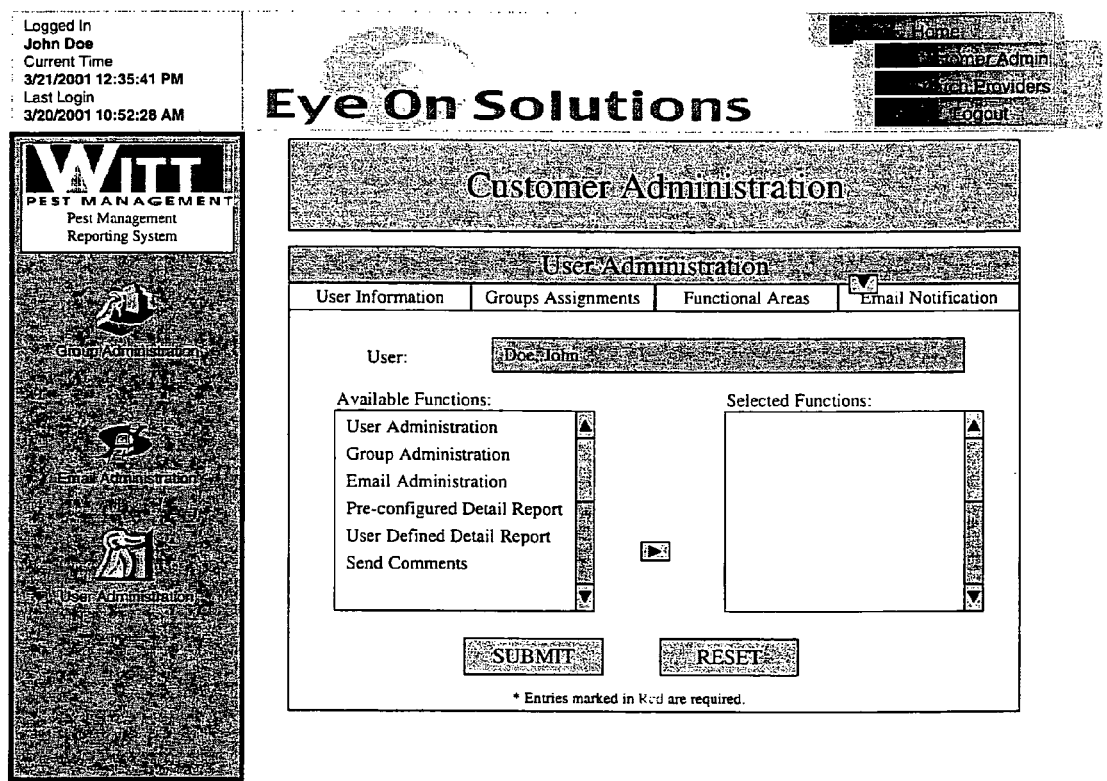
Figure 10U:
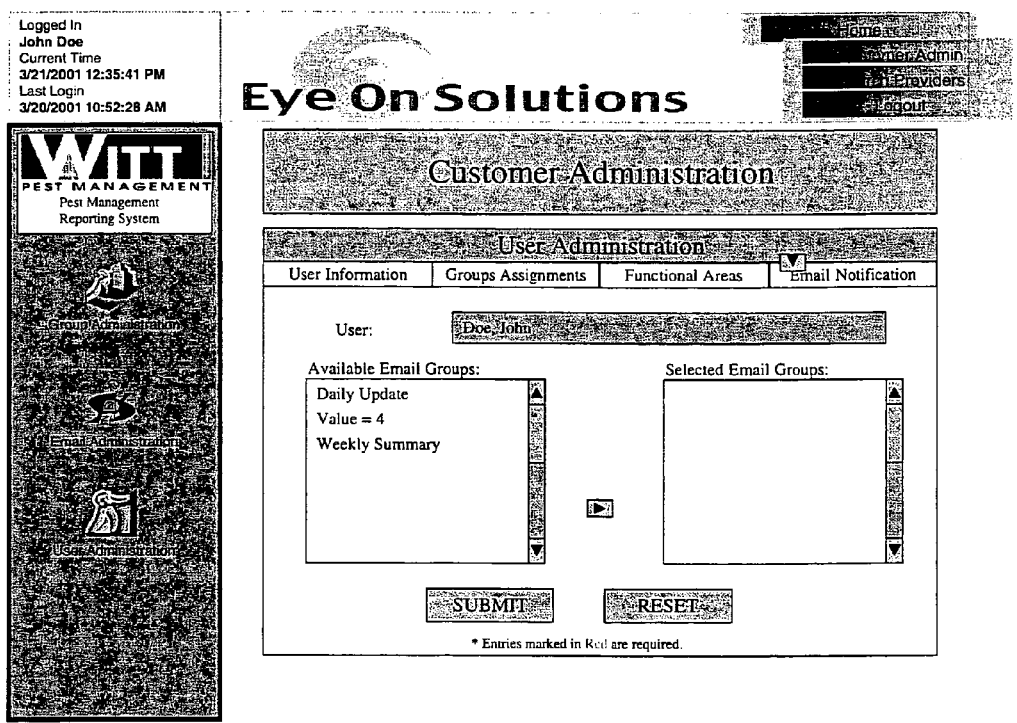
Figure 10V:
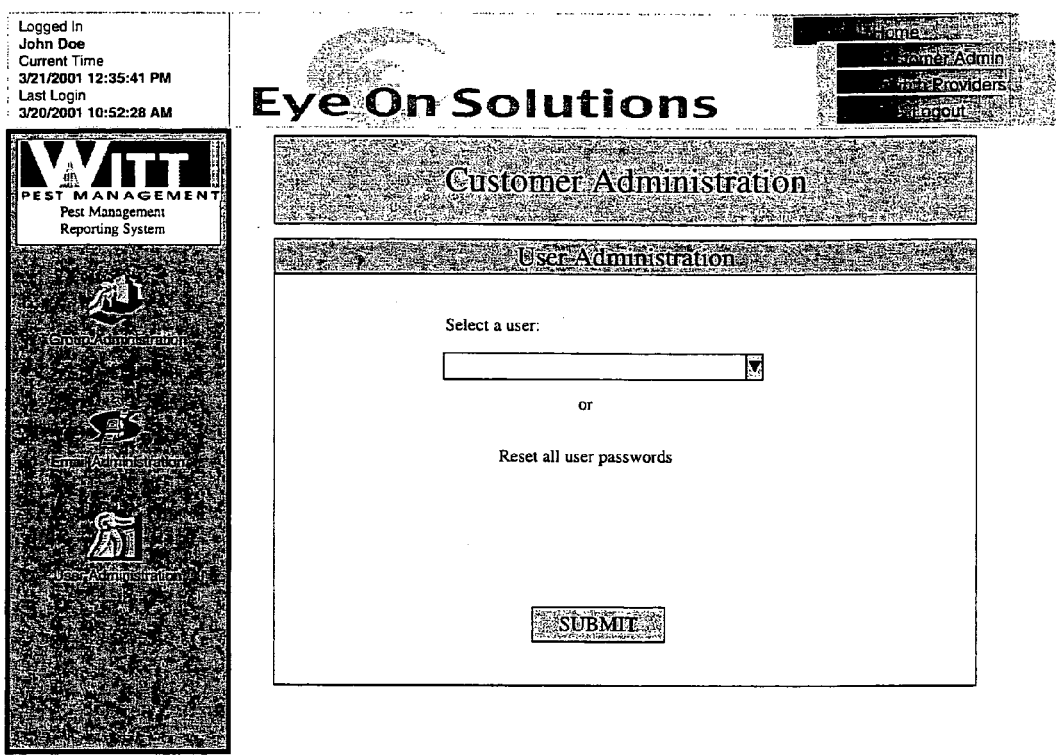
Figure 10W:
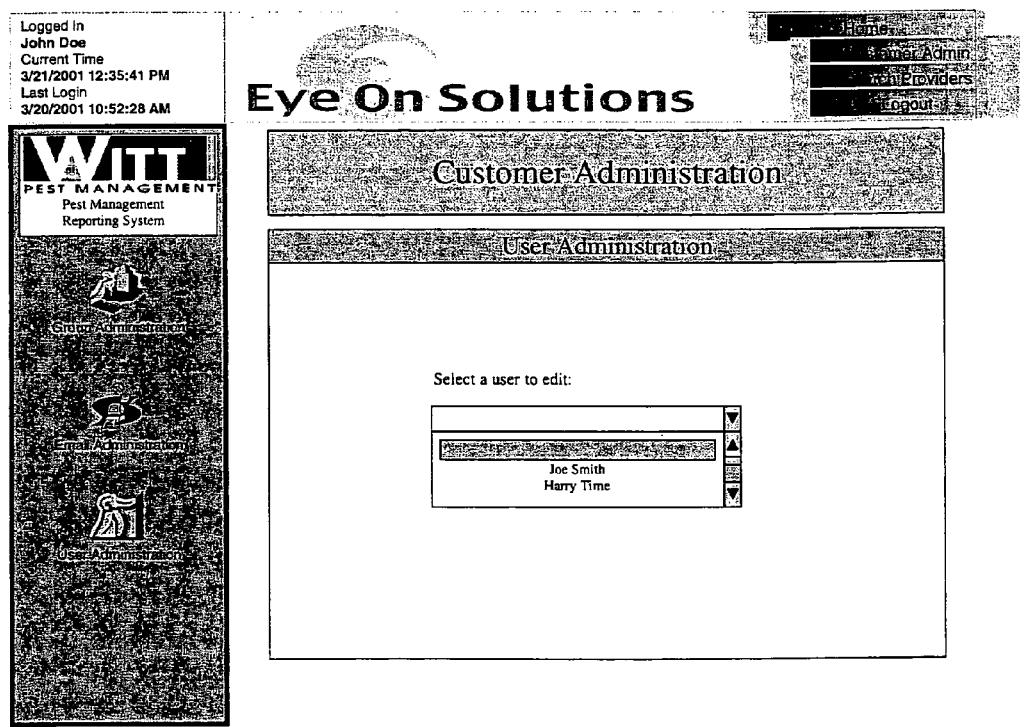
Figure 10X:
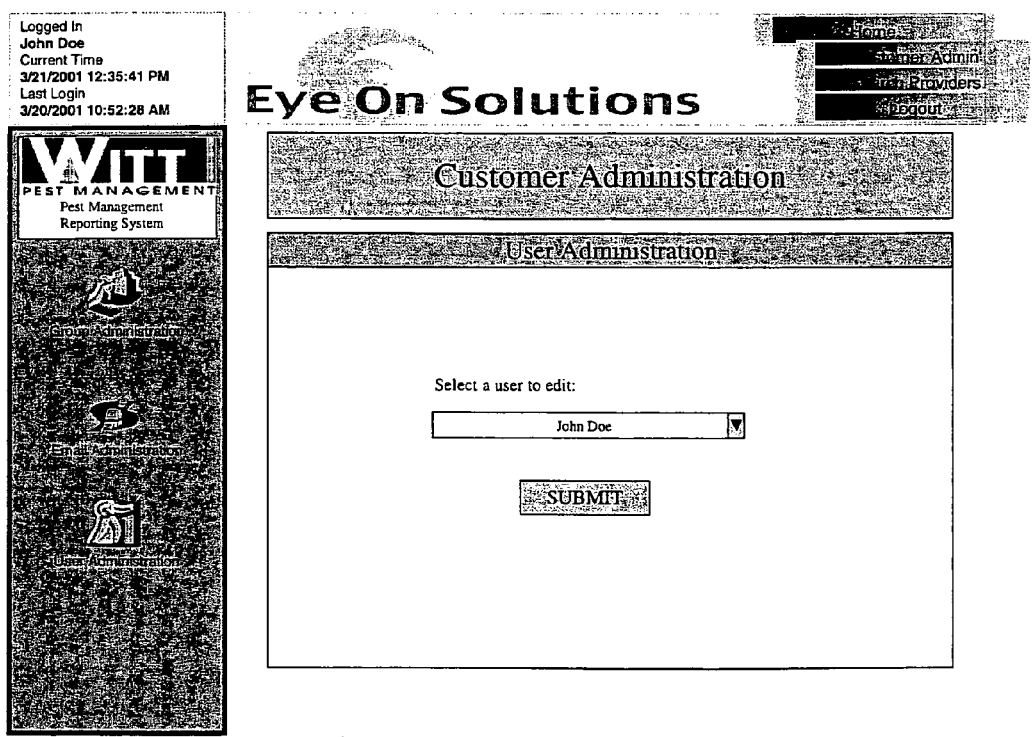
Figure 10Y:
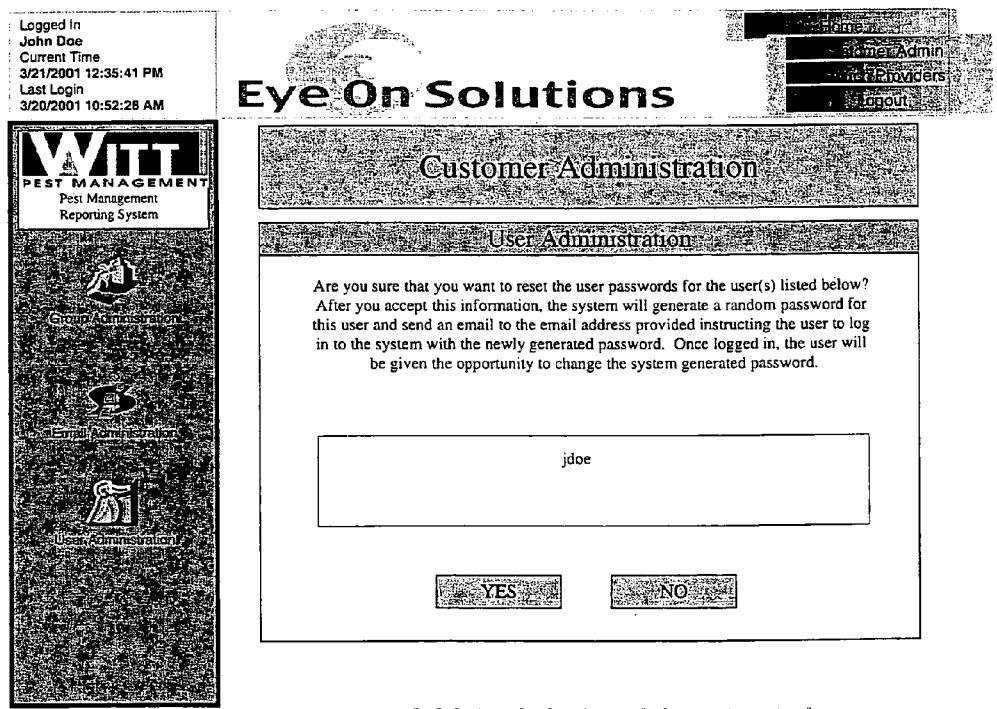
Figure 10Z:
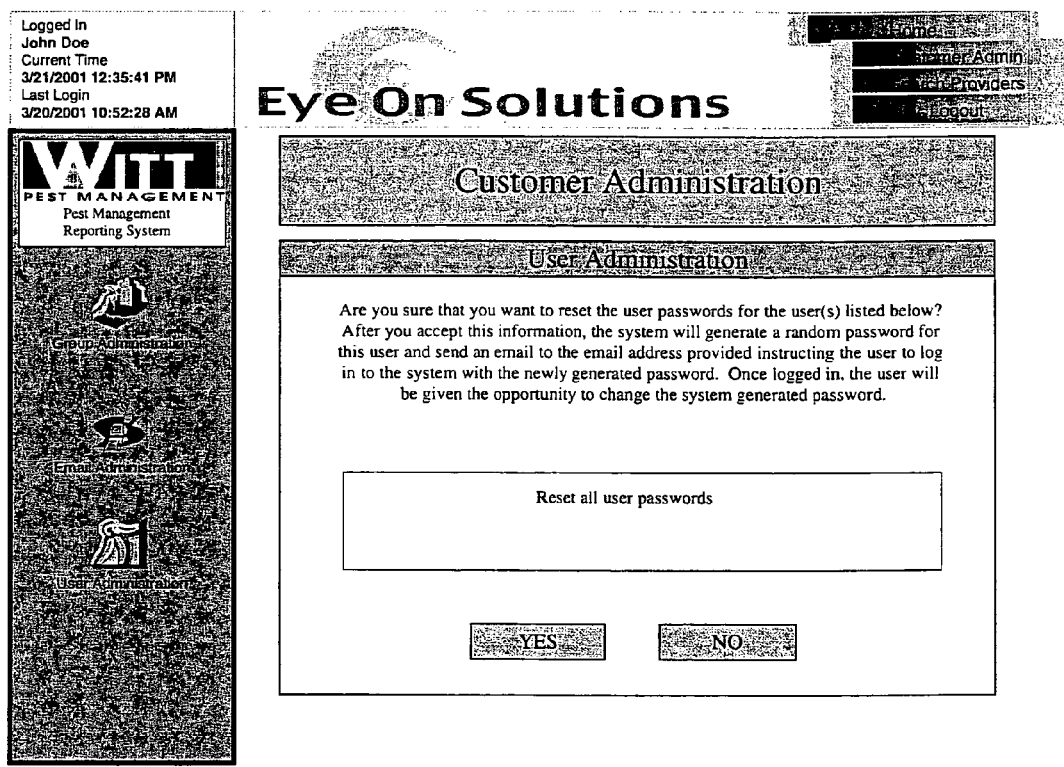

Referring to FIG. 6A, a flow chart of a detection method in accordance with the present invention includes sensing a physical characteristic of at least one of a pest and a bait or environmental condition, block 610, generating an electrical signal that corresponds to the physical characteristic, block 620 and processing the electrical signal to provide physical characteristic data, block 630, and transmitting the physical characteristic data over a communication link, block 640. The data collector unit 14 receives the physical characteristic data from the detector 12 and routes it to the Web server 20 to be used for pest detection and control applications. The database 18 stores detection data received from the Web server 20 that has been processed by detector 12 and/or data detector collector unit 14 and/or Web server 20? as derived from the received physical characteristic data. For example, based on the length, width or height physical characteristic data of a pest, the sensing system of the invention can determine the type of a detected pest. Similarly, based on physical characteristic data related to the volume, weight, or density of the bait, the system 10 can assess the effectiveness of the bait as applied to a treated region. The database 18 is accessible by the Web server 20 for storing and retrieving any pest control and detection data. In this way, client stations, such as user devices 22 (shown in FIG. 1) can be used to request and/or receive pest detection and control information originating from various remotely monitored zones. The sensor unit 12 can also transmit messages related to the remaining battery life, bait or pest weight changes, sound identification pest activity levels, bait age, or bait status.

From the foregoing, it would be appreciated that the present invention can capture and communicate valuable data usable for variety of pest management application. Because the sensor units of the present invention are microprocessor based, they can be programmed to process the physical characteristic data in any suitable manner. For example, the CPU can be programmed to make differential measurement determinations related to a change in a physical characteristic, such as weight, length, etc. Related data derived from such determinations can be routed, via the data collection unit 14, to the Web server 20, for the processing and user interface.

System Use

The preferred embodiment implements an application service provider ("ASP") database solution, accessible over the Internet, to allow both service providers and their customers to process information pertinent to the services provided to the customer, such as schedules, project completion status, monitored conditions, account tracking, etc. . . . The types of data and other system functionality and preferences provided by the ASP may be customized directly by the customer or service provider. The ASP, either itself or through the service provider, hosts and maintains the core application hardware, software and databases (including security). Through a network communication link established over the Internet, customers and service providers remotely input and access data, designate system users and access rights, and identify preferences to determine the system functionality provided by the ASP, all of which is managed by the Web server 20 which processes the system data for storage in the database 18 and also processes the inputs made and outputs received by the users. FIG. (6B) shows the hierarchical breakdown of administrative system functions provided by the present invention. FIG. (6C) shows the basic process of the present invention wherein the service provider gathers the monitored data from the customer for input into the database and later access and use by the customer and/or service provider via the ASP system over the Internet. The presently preferred embodiment of the software system which permits gathering, processing, storage, access, presentation and use of the data collected by the present invention is shown with reference to FIGS. (7) through (10) in the preferred embodiment of a pest detection, monitoring and management system.

There are three categories of users who may use and access the system data and functions provided by the ASP. Administrative users are agents of the service provider that designate other users and their access rights, and configure the system to provide the functionality and data desired by the service provider and its customers. Service provider users are representatives of the service provider that are designated by an administrative user to have access to selected features of the system in order to input, retrieve and process data managed by the system for the service provider and its customer(s). Service provider users may be given differing access rights to system features and data to restrict use to only certain projects and/or customers. Customer users are representatives of customers of the service provider that are designated by an administrative user to have access to selected features of the system in order to input, retrieve and process data managed by the system for that customer's accounts and projects. Like service provider users, customer users are given differing access rights so that they will only have use of system features and data for their own projects and accounts, as specified by the administrative user. All users may access the system features and data to which they have been given rights through an Internet browser (preferably Internet Explorer 5x or above). However, in order to perform data input and other administrative tasks, administrative users and service provider users are provided with an administrative "thin-client" application, which can be made available by the ASP over the Internet. The administrative thin client is a self-contained software module that, once downloaded, resides on the user's local computer and enables access to the ASP server software over the Internet to perform administrative tasks or data input. Without an installed administrative thin client and appropriate user access rights, no administrative tasks or data entry can be done. Administrative users manage user names and passwords for each service provider user and customer user to control access rights and security. Administrative users also have the ability to perform any and all of the tasks performed by service provider users and customer users.

FIGS. (7A) through (7C) demonstrate the procedure by which the administrative user customizes the system for a designated customer of a particular service provider, including designation of customer users and customer groups, respectively. FIGS. (8A) through (8H) demonstrate the procedure by which the service provider user inputs data to record an instance of service activity completed for a particular customer; including, respectively, identification of the type of service activity provided, entry of a new record for that particular instance of service activity, identification of the unit serviced, identification of the severity of the problem found, identification of the type of problem found, identification of the action taken in response to the problem, and an indication of comments describing any special circumstances concerning the problem. FIG. (8I) demonstrates the procedure by which the service provider user edits data for a recorded instance of service activity, which includes the capability to modify each of the pieces of information originally recorded. Finally, FIG. (8J) demonstrates the procedure by which the customer user accesses data relating to a recorded instance of service activity, after its generation and entry into the system by the service provider.

FIGS. (9A) through (9L) demonstrate the types of functionality available for a pest monitoring service through use of the system of present invention, described with reference to a typical termite baiting process. Termite monitoring is typically accomplished by installing monitoring stations around the outside and inside of the monitored structure. The termites will feed on a wood stick installed in the station prior to feeding on the structure. The stations are checked regularly for termite activity, and if found, the wood stick is replaced with a bait tube containing the termites. The termites feed on the chemicals in the bait tube and return to the colony to send other termites to feed on the bait tube. Eventually, this process kills the colony and the bait tube is replaced with a new wood stick to continue to monitor for new termite colonies near the structure. The functions shown in FIGS. (9A) through (9L) will change depending on the particular type of service being monitored by the system. Prior to the present invention, the customer was typically given little information relating to the status of these types of processes.

The status of each station can be updated using the automatic monitoring system 10 of the present invention, or alternately by manual recording of the status using for example a barcode reader. This information is loaded into the database 18 via the Web server 20 over the Internet 16, whereupon a new service record is generated and notification of the customer and/or service provider is accomplished via an email link to the Internet web page containing the login screen for the ASP system, as shown in FIG. (9A). The user responds to the login screen by providing a username and password to obtain access to the system, as shown in FIG. (9B). Once logged into the system, the customer is presented with a summary screen for the provider of the monitoring service information being accessed, as shown in FIG. (9C). A selection of the service provider for the particular information being retrieved would be necessary if more than one provider is servicing that customer, as shown in FIG. (9CC). The summary screen presents the user with overview information regarding the customer account being serviced along with a message from the service provider.

The summary screen is divided into three areas. One area identifies basic system functions and user logon information. Another area identifies the service provider and the system functions made available to the user by that service provider. Based on the selection made from the list of functions available, the remainder of the screen is populated with information made available to that customer by the service provider.

As shown in FIG. (9C) the system offers the user five report functions (although a larger or smaller number can be made available), including account status, service schedule, building layout, detail report, and comments, respectively shown in FIGS. (9D) through (9F) and FIGS. (9K) through (9L). Each of these functions is represented by a screen icon that provides a link to the application software module that executes the function by operating on the customer data managed by the service provider. As shown in FIG. (9D), the account status function displays the financial status for this particular customer account, including past payments made and the current payments due, and optionally providing the customer with the ability to select payment arrangements, including payment online. As shown in FIG. (9E), the service schedule icon displays a calendar for reviewing scheduled services, which is viewable in daily, weekly, monthly, and yearly increments and can be used to schedule visits by the service provider to the customer location in advance. An option is also available for displaying all services scheduled for that customer from all service providers. As shown in FIGS. (9F) and (9G) the building layout icon displays an overhead layout of the customer location with the individual monitoring stations identified as well as any other area landmarks. Each station is color coded based on the monitored value assigned at the time of the last service, and the database 18 can be queried by service date to show the layout as it was on any given date. Each monitoring station on the layout can also be queried individually to display a status history for that station. This same type of module could be used for other monitoring systems to display status history for other types of services. As shown in FIGS. (9H) through (9K), the detail reports icon provides the ability to query the database for specific detailed information regarding customer service history using pre-configured query options or user-created custom queries. Finally, as shown in FIG. (9L) the comments icon displays a web page allowing the user to create and send an email message to the service provider.

FIGS. (10A) through (10Z) demonstrate the customer administration features of the system, which is designed for multi-location, multi-user organizations. The user login features are the same as described above with respect to FIGS. (9A) through (9C). Once logged in, the customer administration functions are accessed by selecting the customer administration link on the service provider summary screen, as shown in FIG. (9CC). The customer administration functions are divided into three general areas (although a greater or lesser number can be specified), including group administration, email administration, and user administration, as shown in FIG. (10A).

As shown in FIGS. (10B) through (10D), group administration can be used to create groups of units that can be accessed by users assigned to that group. Units are serviceable entities, for instance a store or restaurant, a department in a store, a monitoring station, etc. The administrative user designates a group type (for example all stores owned by a given company which are serviced by that service provider), then creates groups within the type (for example all stores of the designated company located within a given geographic area), then adds units to the group (i.e., each store of the designated company falling within the selected geographic area). Since units are hierarchical, a unit of a superior level includes all of its children. For instance, if a store has departments and the store is added to a group, then all of its departments are also added to that group. On the other hand, if just one department of a designated store is added to a group, it will be the only department within that store accessible to the selected group, unless remaining department(s) are separately added to the group. Hierarchical group definition allows reporting on all of the children of a given parent unit included within a group, while functional group definition allows reporting on units from different parents depending on whether the reported unit exhibits the selected function.

As shown in FIGS. (10E) through (10J), email administration can be used to create protocols for notification emails to be sent to selected users. The three main elements to the email notification protocol are the frequency, day, and trigger for sending the email. The frequency is the regularity with which the user subscribers of the protocol will receive emails, for instance daily, weekly, monthly or only when the trigger is set off. The day is the calendar day on which the email notification will begin and the recurring day on which it will be delivered. The trigger is the event which will cause the email to be sent; for instance, every time a location in a group is serviced, or every time a certain value is set for a service.

As shown in FIGS. (10K) through (10Z), user administration is used to define the users who are permitted access to the system along with their access rights. Using the user administration functions, the administrative user can create and eliminate users, edit the access rights of existing users, and change user passwords; along with defining group assignments, email protocol subscriptions, and permitted system functions for the user. The access rights are configurable such that a given customer user is only permitted to use the particular types of data, functions and reporting units to which that user has been given access, while a given service provider user may be limited in access to only certain customers or services without having access to all customers or services of that provider. Finally, customers will be given access to information from all providers servicing that customer but will not have access to information from other customers even if those customers also are serviced by those providers, while service providers will be given access to information from all of the customers it services but will not be given access to information from another service provider even if that provider services the same customers.

Although the present invention has been described with respect to presently preferred embodiments related to pest detection and monitoring applications, it is understood that the features of the invention can be applied to any application requiring the remote detection and monitoring of a condition, and the remote storage and access of data relating to the monitored condition. As a result, it is to be understood the invention is not to be limited to the disclosed embodiments, but on the contrary is intended to cover various modifications and equivalent arrangements include within the spirit of the scope of the appended claims.

What is claimed is:

1. A system for processing information which is remotely accessible for computerized monitoring and management of a condition, comprising:

a. at least one device to accept data related to said condition and to provide a corresponding electrical signal representative of said condition;

b. a data collector that processes said electrical signal to provide data relating to said condition;
c. a transmitter that transmits said data over a communication link;
d. a computer system that manages the remote gathering, transmission, processing, storage, access, presentation and use of said data;
wherein said computer system comprises a server which processes said data for storage in a database and provides access to said database for retrieval and use of said data in making determinations related to said condition;
wherein said server remotely hosts hardware and software for managing and maintaining said database and is accessible by users over said communication link; and
wherein said users comprise professional service providers or customers of said professional service providers and wherein said server provides data processing for said professional service providers or said customers to allow gathering, transmission, processing, storage, access, receipt and use of data related to professional services provided to said customer over the Internet;
wherein multiple data types and multiple server functions exist for a customer or a professional service provider, said multiple data types and multiple server functions corresponding to multiple professional services provided to a customer such that said multiple data types and server functions are modifiable for different professional services.

2. The system of claim 1 wherein the types of data and the functions performed by said server in processing said data are specified by said customers or said professional service providers to customize input, access and use of said data or to designate system users and access rights for said users or to identify preferences for managing, processing and using said data.

3. The system of claim 1 wherein a single customer of more than one professional service provider accesses said server for receipt of information of said customer provided by each said professional service provider.

4. The system of claim 3 wherein a plurality of customers of a plurality of professional service providers access said server for receipt of information of said customers provided by said professional service providers.

5. The system of claim 1 wherein more than one customer of a single professional service provider accesses said server for receipt of information of said customers provided by said professional service provider.

6. The system of claim 5 wherein a plurality of customers of a plurality of professional service providers access said server for receipt of information of said customers provided by said professional service providers.

7. The system of claim 1, wherein a plurality of customers of a plurality of professional service providers access said server for receipt of information of said customers provided by said professional service providers.

8. The system of claims 1, 3, 5, 4, or 6 further including a receiver for processing a request for information over the communication link.

9. The system of claims 1, 3, 5, 8, 4, or 6 wherein said condition relates to at least one of a pest or a bait or an environmental condition.

10. The system of claim 1, 3, 5, 8, 4, or 6 wherein said communication link comprises at least one of a wired link or a wireless link.

* * * * *